United States Patent
Hayashida et al.

(10) Patent No.: US 7,158,039 B2
(45) Date of Patent: Jan. 2, 2007

(54) LIQUID LEAKAGE SENSOR AND LIQUID LEAKAGE DETECTING SYSTEM

(75) Inventors: Tatekazu Hayashida, Kanagawa (JP); Futoshi Shimai, Kanagawa (JP); Yohey Omata, Kanagawa (JP)

(73) Assignees: Tsuden Kabushiki Kaisha, Sagamihara (JP); Tokyo Ohka Kogyo Co., Ltd., Kawasaki (JP); Toyokokagaku Co., Ltd., Kawasaki (JP)

( * ) Notice: Subject to any disclaimer, the term of this patent is extended or adjusted under 35 U.S.C. 154(b) by 228 days.

(21) Appl. No.: 10/977,553

(22) Filed: Oct. 29, 2004

(65) Prior Publication Data

US 2005/0162280 A1 Jul. 28, 2005

(30) Foreign Application Priority Data

Oct. 30, 2003 (JP) ............................. 2003/370439
Sep. 24, 2004 (JP) ............................. 2004-277372

(51) Int. Cl.
*G08B 21/00* (2006.01)

(52) U.S. Cl. .................. 340/605; 340/618; 340/632
(58) Field of Classification Search ........... 340/603, 340/604, 605, 618, 619, 620, 625, 632; 73/290 R, 73/290 V, 293; 356/338, 342; 324/553
See application file for complete search history.

(56) References Cited

U.S. PATENT DOCUMENTS

| | | | | | |
|---|---|---|---|---|---|
| 5,583,441 | A | * | 12/1996 | Bitts | 324/553 |
| 5,687,687 | A | * | 11/1997 | Trueblood et al. | 123/196 S |
| 5,946,967 | A | * | 9/1999 | Russell | 73/290 R |
| 6,876,305 | B1 | * | 4/2005 | Kadwell et al. | 340/630 |

FOREIGN PATENT DOCUMENTS

| | | |
|---|---|---|
| JP | 04-070572 | 3/1992 |
| JP | 09-113398 | 5/1997 |
| JP | 2002-350275 | 12/2002 |

* cited by examiner

*Primary Examiner*—Van T. Trieu
(74) *Attorney, Agent, or Firm*—Ladas & Parry LLP

(57) ABSTRACT

Among plural liquid leakage sensors placed at the lower most portion of a system such as a floor surface, a leaked liquid storing portion, etc., an error-activated location of the sensor can be easily identified uniquely when the sensor is detecting any abnormality. In a liquid leakage detecting system including at least one liquid leakage sensor having at least one detecting portion contactable with a leaking liquid through an air layer or a liquid permeable layer, a warning device including a sound producing is placed within a specified spatial distance from each installation position of the liquid leakage sensor, wherein after detecting any abnormal conditions of the liquid leakage sensor, a warning signal is issued at least in an audio frequency based on the warning device in order to discriminate the error-activated leakage sensor from other non-activated leakage sensors placed outside of the specified spatial distance and uniquely identify the installation position of the activated leakage sensor.

32 Claims, 9 Drawing Sheets

(A)

(B)

(C)

LIQUID LEAKAGE SENSOR AND LIQUID LEAKAGE DETECTING SYSTEM

BACKGROUND OF THE INVENTION

1. Field of the Invention

The present invention relates to improvements of a liquid leakage sensor and a liquid leakage detecting system for detecting a leakage of an electrically conductive liquid such as a water, an acid solution, or an alkaline solution, etc., and a leakage of a liquid having an insulating property such as a super pure water, an organic solution of an alcohol, a thinner, or a benzine, etc.

2. Background Art

Conventionally, a liquid is supplied through piping in a facility of a factory, etc. However, since the number of joints connecting these pipes is very numerous, there are many cases in which a liquid is leaked from these joints. Therefore, an operator had to monitor a leaking liquid at all times according to the kinds of liquids. As such a conventional liquid leakage sensor, a leakage sensor based on measuring an electrical conductance between electrodes is known for determining a leakage from an impedance change, and a leakage sensor based on measuring a volume of the liquid is also known in which the specified quantity of the liquid is checked whether accurately supplied or not. Further, a patent literature 1 describes an optically measuring technique of a liquid leakage sensor. In this art, a light is projected from a light-emitting portion (light source) to a filter on which the opaque filter changes into a transparent state by absorbing a leaked liquid. Therefore the liquid leakage can be accurately detected based on measuring the amount of a received light through the transmitting filter or from a reflecting light on the above filter. In these conventional leakage sensors, abnormal status-conditions of these sensors are generally displayed on an alarming display-means such as an LED, etc. and digitally issued as an external output through a contact signal, etc., immediately after detecting a leaking liquid or detecting mal-installation conditions of the sensor at a predetermined spatial position.

On the other hand, a patent literature 2 describes a liquid leakage monitor system wherein desired information such as an impedance between the electrodes of a child leakage sensor, etc. are communicated among plural child devices and a parent device, and these information are displayed on a display means of the parent device after these information are processed in the parent device, or transparently passed. In the patent literature 2, after it is determined that an abnormal condition of a child sensor device is detected, an alarm signal of this leakage sensor is displayed on a screen image and/or on a recording means, and further reported by an audio means such as a buzzer, etc.

By the way, (A) in case of detecting a leaking liquid such as a cleaner/a solvent, for example, a liquid having a low surface tension of $6 \times 10^{-2}$ N/cm or less at 20° C., a leaking liquid $2a$ is diffusing on a floor while forming a very thin layer as shown in FIG. 6B, further, in case of detecting a leaking liquid having a low surface tension of $3 \times 10^{-2}$ N/cm or less at 20° C. such as a low molecular chlorofluorocarbon (CFCs), a halon, etc. not including a chlorine or a bromine, the leaking liquid is rapidly diffusing uniformly with the thinner film layer having 0.5 mm or less in thickness $d1$, and easily permeating into an air gap portion of a very narrow distance of 0.1 mm or less. In this very narrow air gap, the leaking liquid is at first permeating into the clearance $d2$ (<$d1$) between a case holder of a sensor main body and a floor surface (FIG. 6C). So that it takes a long time for the leaking liquid to diffuse over the upper surface of the holder. Consequently, the following problems cannot be resolved, that is, a small amount of a leaking liquid cannot be detected at all, or too many times are wasted until a detection of a bit of a liquid is started.

(B) Further, in the conventional liquid leakage sensor, a wired-OR logical operation for alarming external-outputs of plural sensors is conveniently performed, and these digital outputs are commonly connected and inputted into a single port of the sequencer, or a parent device, etc. at each specified group unit. Then, after detecting abnormal conditions of a leakage sensor, a common warning signal is issued from the sequencer or the parent device. After issuing the warning signal related to the plural leakage sensors, a maintenance problem of a system in a plant occurs, that is, an operator cannot identify quickly where is the error-activated sensor in order to spatially access and repair the abnormal condition among commonly connected plural sensors. Furthermore, from a view point of the environmental working-conditions, liquid leakage sensors are generally installed at the lowermost portion of a system such as a floor surface, or a liquid storing pan, etc. and various system components are placed at an upper space of the system, therefore, another maintenance problem also occurs in which a light emitting-type alarm display-means such as LED, etc. attached to the liquid leakage sensor itself is functioning very difficult to visually recognize the location of an error-activated sensor among plural sensors, and it is generally difficult to identify easily the location of a leak-activated sensor through the display means installed at the lowermost portion of the system.

(C) Moreover, in the liquid leakage detecting system of the patent literature 2, etc., there are generally existing no relations at all between an operator for installing the liquid leakage sensors and an operator for maintaining and monitoring the system of a plant, etc. As for the operator installing the leakage sensors, it is only required to install accurately all of many commonly connected sensors at the given spatial-positions within a short time. Therefore, as a desk theory, it is possible for the operator to require a registering operation in which each installation location of a sensor is registered into a monitor system one by one. However, in a practical sense, it is impossible to require such a registering operation for one operator wherein he must accurately install more than forty sensors at each specified location, then execute wiring operation without any mistakes, at next step register and verify each installation location of respective sensor accurately. In a system installation, if plural workers are admitted in the installation work of the leakage sensors, a purchase price of the sensors is unnecessarily sky-rocketed. Therefore, for an operator of the sensor installation, the technique disclosed in the patent literature 2 is completely useless in a practical sense.

Furthermore, in the technique of the patent literature 2, the system is constructed such that a warning signal is displayed in a display of the parent device after processing is done on the parent, or raw data are transmitted transparently throughout the system. Therefore, when any system failure is occurred in the parent, another problem is also invited wherein no warning signals can be issued from the parent while detecting any error conditions in a normal child sensor.

In addition, the technique of the patent literature 2 discloses a system wherein a liquid leakage error is announced in a form of voice messages provided from a warning means in the parent after processing in the parent, or raw data are transmitted transparently throughout the system. Therefore, it is essential that the spatial positioning information concerning the error-activated sensor should be contained in the contents of the voice warning messages. And as for the operator for maintaining or monitoring the system of a plant, it is also essential that the announced voice warning messages must be accurately heard by the operator, then the location of the detecting error must be correctly understood, and the spatial position of the error-activated sensor must be uniquely identified. However, in the severe job/field site conditions, a frequent use of a dispatch staff member and frequently repeated personnel exchanges, there are almost no times/costs spending for an education of teaching about the installation positions of the liquid leakage sensors, etc. Therefore, another problem is also invited in the alarming system of the patent literature 2 wherein as for a newcoming operator or an operator insufficient in a memory power/a learning ability, the announcing system consisting of warning voice messages is completely useless in order to repair or exchange the error-activated leakage sensor.

(D) When a liquid leakage sensor and its warning means are integrally formed, it is desirable that the total height of a sensor from a floor surface to its top is as low as possible. Because a liquid leakage sensor is generally installed at a narrow lower space near a floor surface and can be easily interfered with a passing space of an operator.

Patent literature 1: JP-B-4-70572
Patent literature 2: JP-A-2002-350275

SUMMARY OF THE INVENTION

The present invention is conceived in consideration of the situations described above, and an object of the present invention is to provide a liquid leakage sensor enabling to detect a leaking liquid at a very high speed even in a small amount of a liquid having a low surface tension of $6 \times 10^{-2}$ N/m or less at 20° C.

Further, another object of the invention is to provide a liquid leakage sensor and a liquid leakage detecting system wherein plural liquid leakage sensors are installed into a control system at each specified group unit with wired-OR connected external outputs, and in case of issuing a warning signal from the system after detecting any error, it is enabled for the maintenance operator of the plant system to accurately and easily identify the spatial position/location of the really error-activated sensor among plural sensors in the commonly-connected group unit.

Furthermore, another object of the invention is to provide a liquid leakage sensor and a liquid leakage detecting system wherein plural liquid leakage sensors are installed into a control system at each specified group unit with wired-OR-connected external outputs, and in case of installing each group unit, it is enabled for only one operator to accurately install each respective sensor at the given spatial location in a short time.

Further, another object of the invention is to provide a liquid leakage sensor and a liquid leakage detecting system wherein it is enabled for the operator of a plant system to accurately and easily identify the spatial position/location of a really error-activated sensor among plural sensors with wired-OR-connected external outputs in the system, after detecting a leaking liquid based on normally functioning sensors even under a trouble of the control system or without a parent device.

To achieve the above objects, the present invention relates to a liquid leakage detecting system including at least one liquid leakage sensor having at least one detecting portion contactable with a leaking liquid through an air layer or a liquid permeable layer and comprising:

plural sensors detecting a leaking liquid and connected commonly each other with external outputs;

warning means including a sound producing means; and said warning means is placed within a specified spatial distance from each installation position of said liquid leakage sensor, wherein after detecting any abnormal conditions of said liquid leakage sensor, a warning signal is issued at least in an audio frequency based on said warning means in order to discriminate said condition-activated leakage sensor from other non-activated leakage sensors placed outside of said specified spatial distance and uniquely identify said installation position of said activated leakage sensor.

The present invention also relates to a liquid leakage sensor having at least one light-reflecting plane contactable with a liquid, a light source, a photo-detection means, and a control means connected with said light source and photo-detection means. In this case, the object of the invention is achieved by a liquid leakage sensor including an integrally formed case containing the light source and the photo-detection means and consisting of a transparent or translucent member at a bottom portion, or further including a case holder mounted at the bottom edge portion in order to prevent unnecessary reflecting light from a floor surface based on floor characteristics or a color, and overturning, wherein further comprising;

detecting means of abnormal state conditions concerning with said sensor;

warning means including a sound producing means; and after detecting any abnormal conditions of said sensor, a warning signal about said abnormal conditions is issued at least in a form of an audio frequency sound produced by said sound producing means.

According to the liquid leakage detecting system in the present invention, warning means including a sound producing means is installed within a specified spatial distance from each installation position of the liquid leakage sensor, and after detecting any abnormal conditions of the leakage sensors, it is enabled for a maintenance operator to be alarmed/issued at least with warning sounds in an audio frequency based on the warning means attached to each activated leakage sensor in order to distinguish the activated sensor from other non-activated sensors installed outside of the specified spatial distance and uniquely identify the installation position of each activated leakage sensor.

Accordingly, when plural leakage sensors are installed into a control system and connected commonly each other with external outputs at each given group unit, it is enabled for only one operator to accurately install each sensor at the specified spatial position in a short time, and then verify each installation conditions of the respective sensor without searching over a floor surface in order to identify the warning display attached to a conventional sensor. Thus, a reliability of the liquid leakage detecting system can be very improved.

Further, in the liquid leakage sensor and the liquid leakage detecting system of the present invention, no parent devices of a system are required. Even when a repeater system for the external outputs provided from each sensor is broken out, it is enabled for the maintenance of a plant system to normally detect a leakage condition based on normally functioning sensors and issue a warning sound in an audio frequency. Therefore after detecting a leaking liquid under normally functioning sensors, it is enabled for the maintenance operator to accurately specify the leaking position through the warning sound in the audio frequency and distinguish the activated sensor from other non-activated sensors installed outside of a specified spatial distance and uniquely identify the installation position of the error activated sensor. According to these merits provided from the present invention, a detecting position of a leaking liquid can be accurately specified/identified by the maintenance operator based on simply approaching a sounding source depending on the warning sounds supplied from the activated sensor even in a maintenance of a semiconductor production process in which confusions/false recognitions are easily invited from such an working environment where plural leakage sensors having the same function are arranged in parallel with each other. Furthermore, the present invention is very useful for an operator to enable to maintain very easily a leakage detecting system without learning a special installation positioning-map of the leakage sensors.

And, in the liquid leakage sensor and the liquid leakage detecting system of the present invention, a small amount of a leaking liquid can be accurately detected for an electrically conductive liquid such as a water, an acid solution, or an alkaline solution, etc., and a liquid having an insulating property such as a super pure water, an organic solution of an alcohol, a thinner, or a benzine, etc. Further, a very small amount of a leaking liquid can be detected at high speed for a liquid having a low surface tension of $6 \times 10^{-2}$ N/m or less at 20° C., particularly, even for a liquid having a low surface tension of $3 \times 10^{-2}$ N/m or less at 20° C. and having a diffusing characteristics such as a very thin layer.

DETAIL DESCRIPTION OF THE INVENTION

Figure 1:
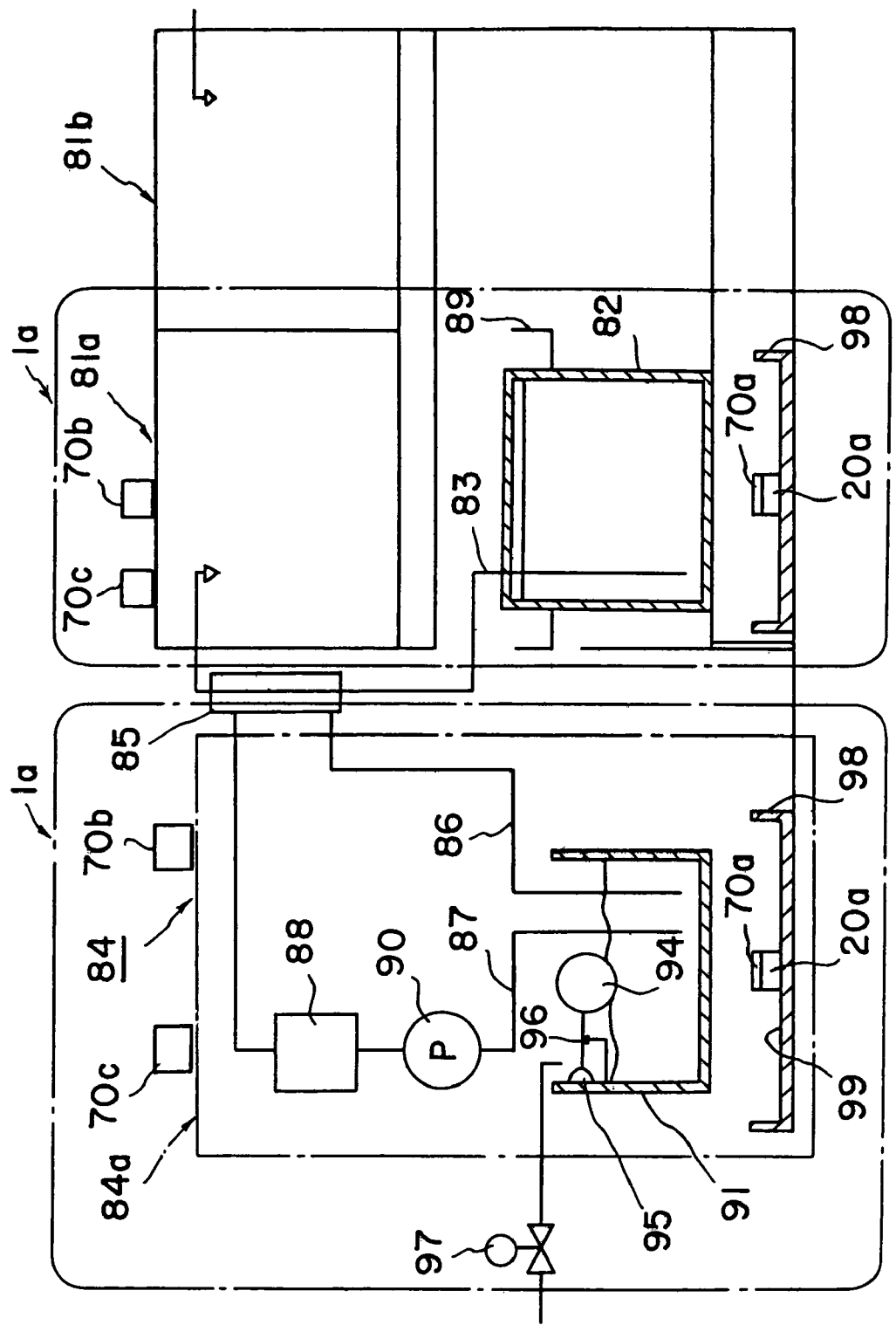
FIG. 1 depicts a block diagram showing one mechanical embodiment in a coating and developing equipment for a liquid leakage detecting system 1a of the present invention.

A liquid leakage detecting system of the present invention is including at least one liquid leakage sensor having at least one detecting portion contactable with a leaking liquid through an air layer or a liquid permeable layer and comprising:

plural sensors detecting a leaking liquid and connected commonly each other with external outputs;

warning means including a sound producing means; and said warning means is installed within a specified spatial distance from each installation position of said liquid leakage sensor, wherein after detecting error-activated liquid leakage sensor based on any abnormal conditions, a warning signal is issued at least in an audio frequency based on said warning means in order to distinguish said activated leakage sensor from other non-activated leakage sensors installed outside of said specified spatial distance and uniquely identify the installation position of said activated leakage sensor.

It is preferable for a single or plural liquid leakage sensors installed within the specified spatial distance to be enabled to share the warning means commonly. Further, it is more preferable to additionally install a warning lamp for the warning means in a spatial position enabled to be easily visible.

As for the liquid leakage sensor used in the liquid leakage detecting system of the present invention, the liquid leakage sensor and the warning means including the sound producing means can be integrally formed, and/or the liquid leakage sensor and the warning means including the sound producing means can be separately installed wherein the liquid leakage sensor and the warning means can be mutually connected with a wire and/or wireless means.

In a system installation of integrally forming a liquid leakage sensor and warning means including a sound producing means, the warning means described above is integrally formed and fixed at the installation position of the liquid leakage sensor. Therefore, no registration operations of a specified number for identifying the sensor are required at all, and the system is very easily installed, and a verifying operation for the connection of the sensor can be easily done. Further, it is possible to provide a system wherein a maintenance or monitor operation of such a system can be done and understandable very intuitively and easily.

On the other hand, in a system installation wherein a liquid leakage sensor and a warning means including a sound producing means are separately installed and connected with a wire, the warning means placed separately can be preferably installed at a position providing a good field of view in an upper space of the system, and adjusting, maintaining or controlling operations can be done easily by anybody in this system.

Further, in a system installation wherein a liquid leakage sensor and a warning means including a sound producing means are separately installed and connected with wireless means, the warning means placed separately can be preferably installed at a position providing a good field of view in an upper space of the system, and the warning means can additionally provide an explosion-proof structure, and a leaking detection of a volatile liquid or an igniting liquid can be done very safely and reliably. Furthermore a warning process and monitoring process of the system can be also done very safely and reliably. In addition to these, adjusting, maintaining or controlling operations can be done easily by anybody in this system without learning a special installation map for the leakage sensors.

Further, in another example of a liquid leakage sensor of the present invention, it is possible to embody a liquid leakage sensor having at least one light-reflecting plane contactable with a liquid, a light source, a photo-detection means, and a control means connected with said light source and photo-detection means. In this case, the liquid leakage sensor has an integrally formed case containing the light source and the photo-detection means and consists of a transparent or translucent member at a bottom portion, or further has a case holder mounted at the bottom edge portion of the case in order to prevent for receiving unnecessary reflecting light from a floor surface based on the floor characteristics or a color, and prevent from overturning. In addition, the liquid leakage sensor has detecting means for abnormal conditions of the sensor and warning means including a sound producing means. And after detecting any abnormal conditions for the sensor, warning signals for the abnormal conditions are issued at least in audio frequency sounds produced by the sound producing means in order to distinguish the error-activated sensor from other non-activated leakage sensors installed outside of the specified spatial distance and uniquely identify the installation position of the activated leakage sensor.

Furthermore, it is preferable for a single or plural leakage sensors installed within the specified spatial distance to be enabled to share the warning means commonly, and it is more preferable to additionally install the warming means at a spatial position enabling to be easily visible. A liquid leakage sensor and a liquid leakage detecting system of the present invention will be shown and described in detail with reference to the following drawings.

Figure 2:
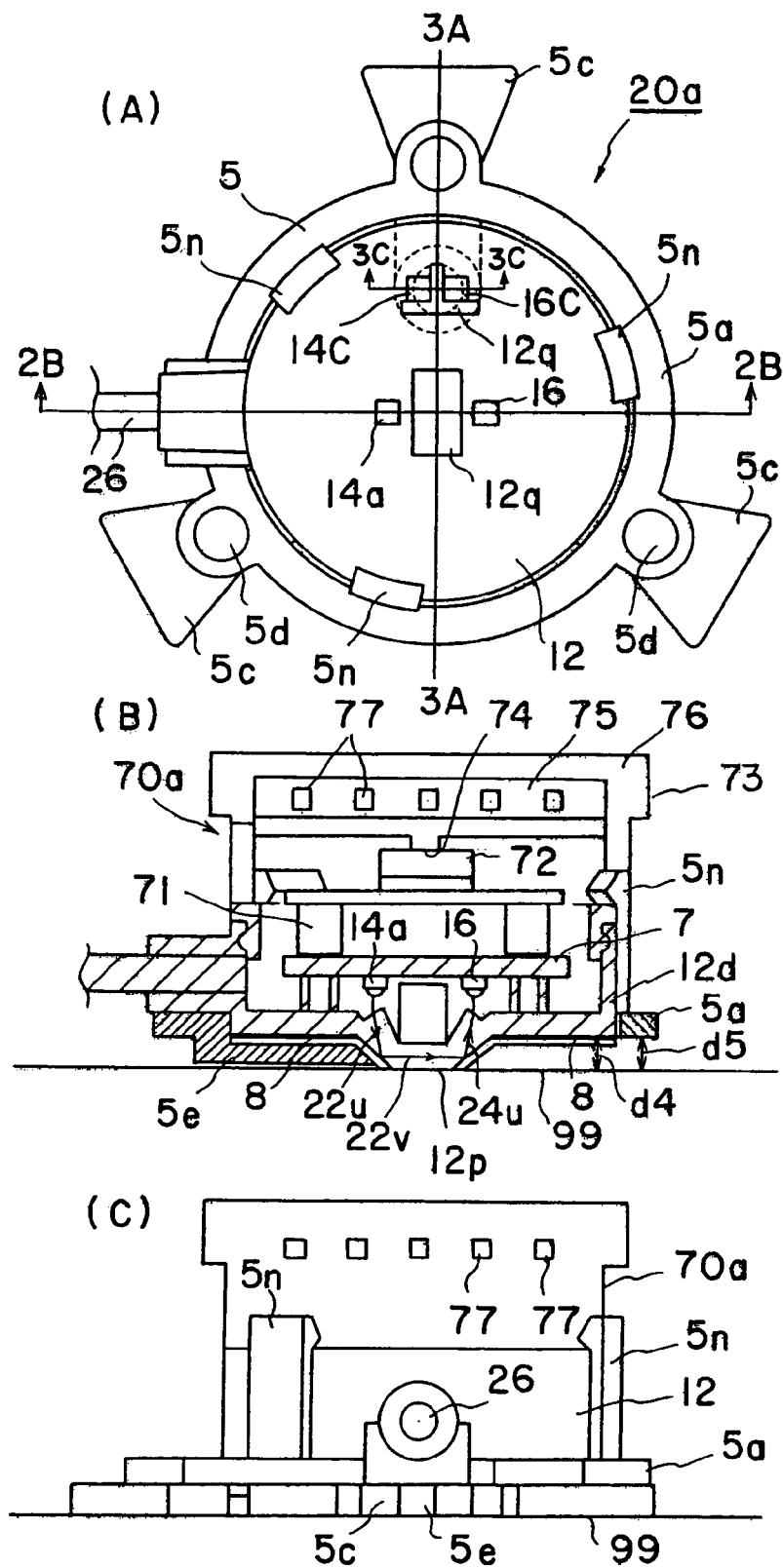
FIG. 2 depicts an integrally formed embodiment of the present invention wherein a detecting portion of a leaking liquid is comprised by a liquid leakage sensor 20a and a warning means 70a including a sound producing means.

FIG. 1 depicts a block diagram showing a mechanical embodiment in a coating and developing equipment for a liquid leakage detecting system 1a of the present invention;

FIG. 2 depicts an integrally formed embodiment of the present invention wherein a detecting portion of a leaking liquid (a sensing portion of a leaking liquid) is comprised by a liquid leakage sensor 20a and a warning means 70a including a sound producing means;

FIG. 2A depicts a plan view showing a structure of the liquid leakage sensor 20a for an embodiment of the present invention.

FIG. 2B depicts a cross sectional view taken along line 2B—2B of FIG. 2A

FIG. 2C depicts a side view of the sensor 20a.

Figure 3:
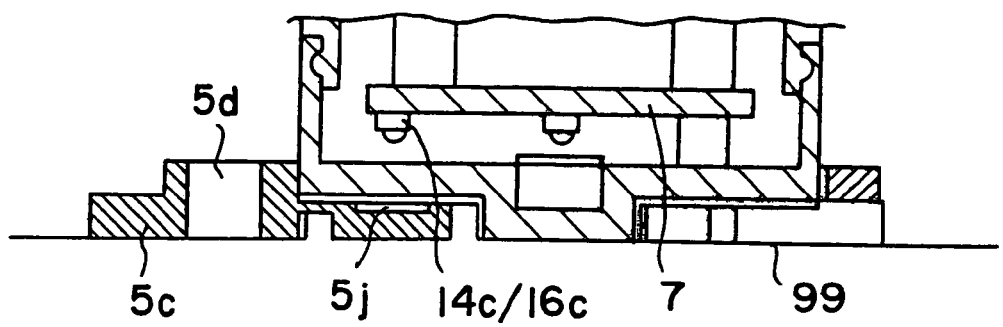
FIG. 3 depicts a cross-sectional view and an enlarged view of the detecting portion of a leaking liquid.
Figure 3:
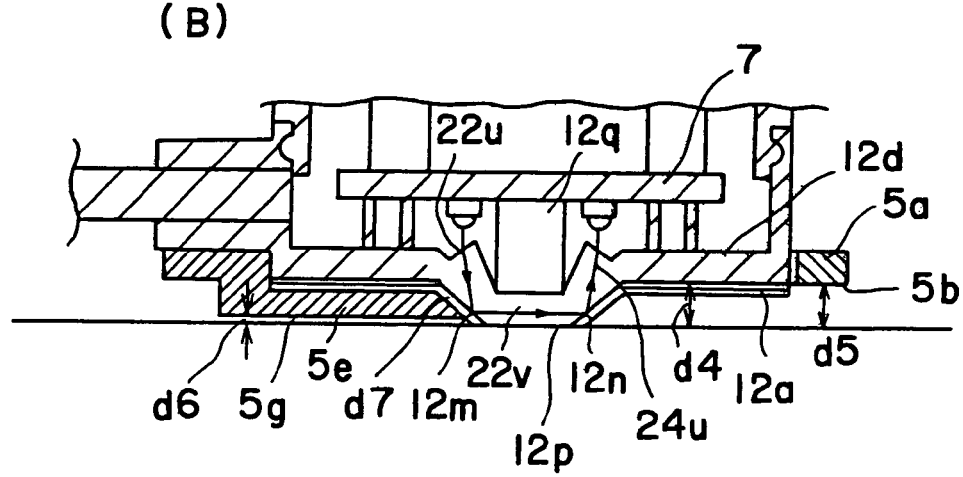
Figure 3:
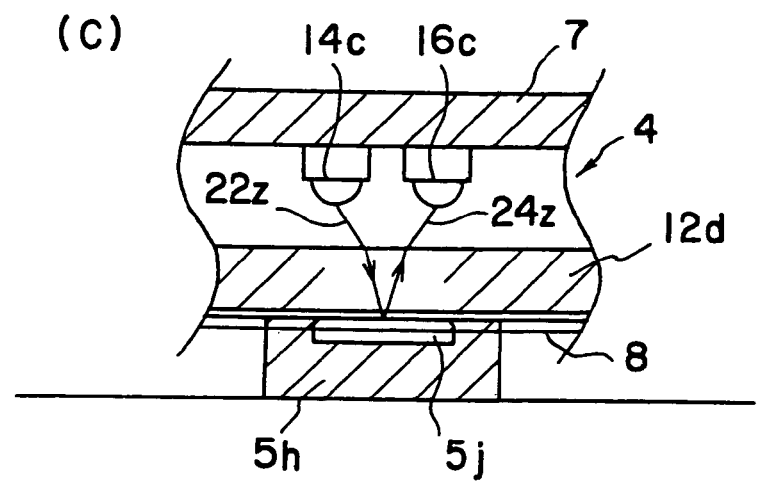

FIG. 3A depicts a longitudinal sectional view taken along line 3A—3A of FIG. 2A.

FIG. 3B depicts an enlarged view of FIG. 2B.

FIG. 3C depicts a cross sectional view taken along line 3C—3C of FIG. 2A.

FIG. 4A depicts a plan view of a holder 5 for an embodiment of the present invention.

FIG. 4B depicts a central cross sectional view of the holder 5.

FIG. 4C depicts a plan view of a thin paper 8 having a cutting portion 8d.

Figure 5:
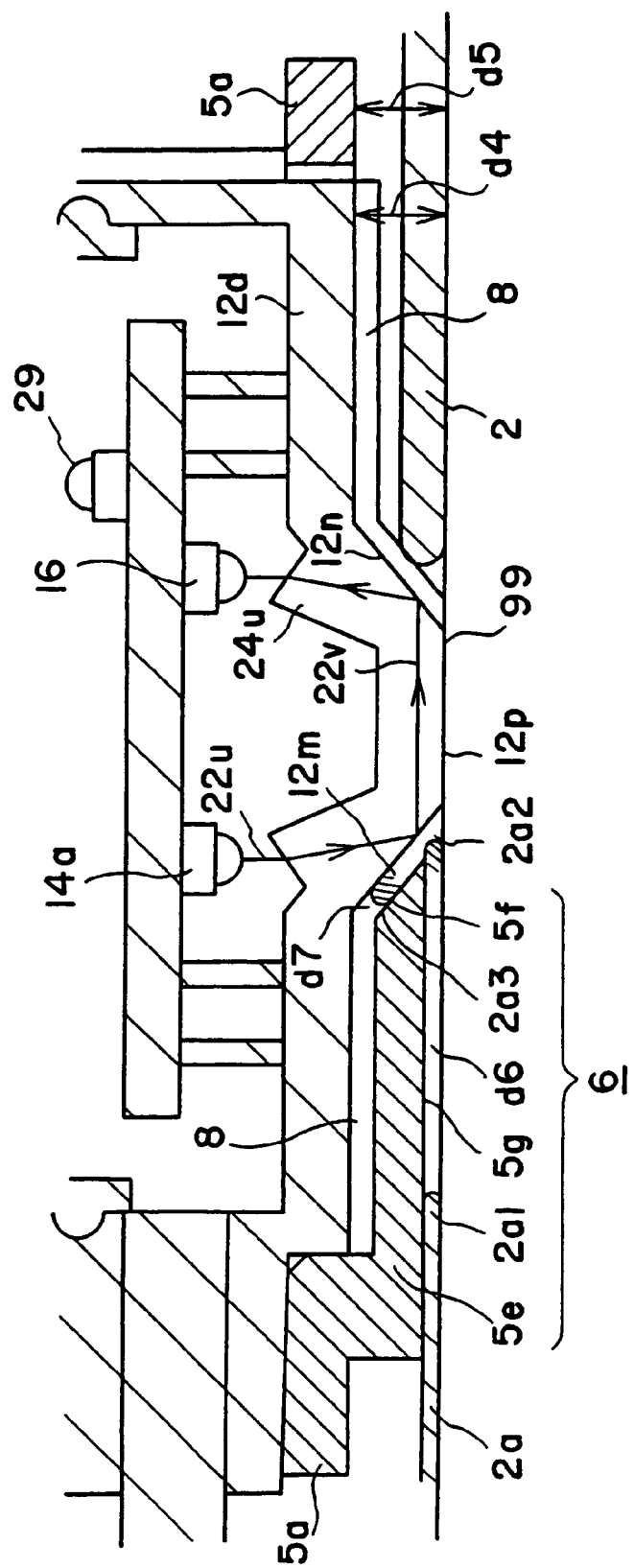
FIG. 5 depicts an enlarged sectional view showing a principle of a high-speed liquid sucking means 6 for the present invention.
Figure 6:
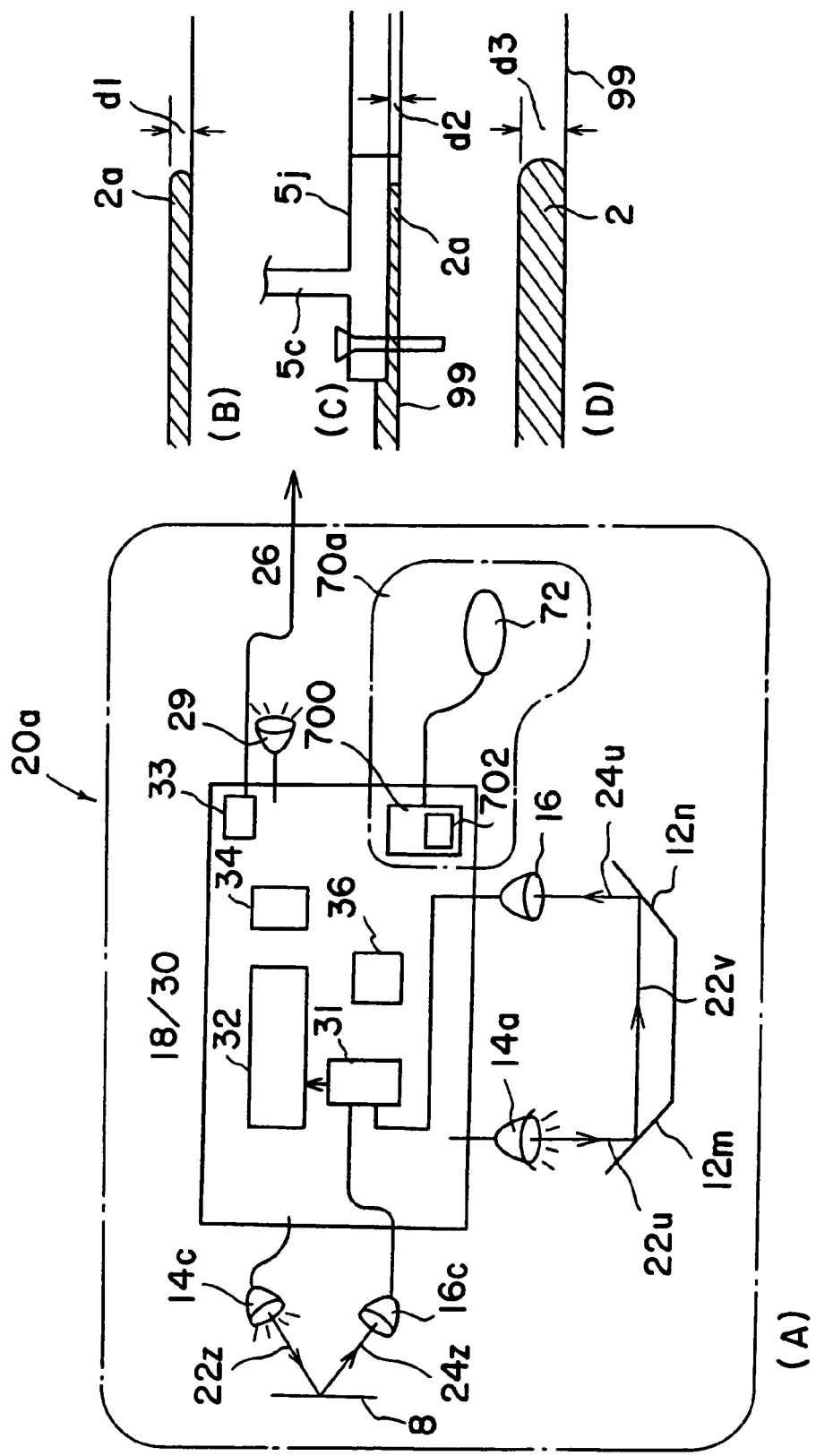
FIG. 6 depicts a block diagram of a signal processing in the liquid leakage sensor 20a for the present invention.
Figure 7:
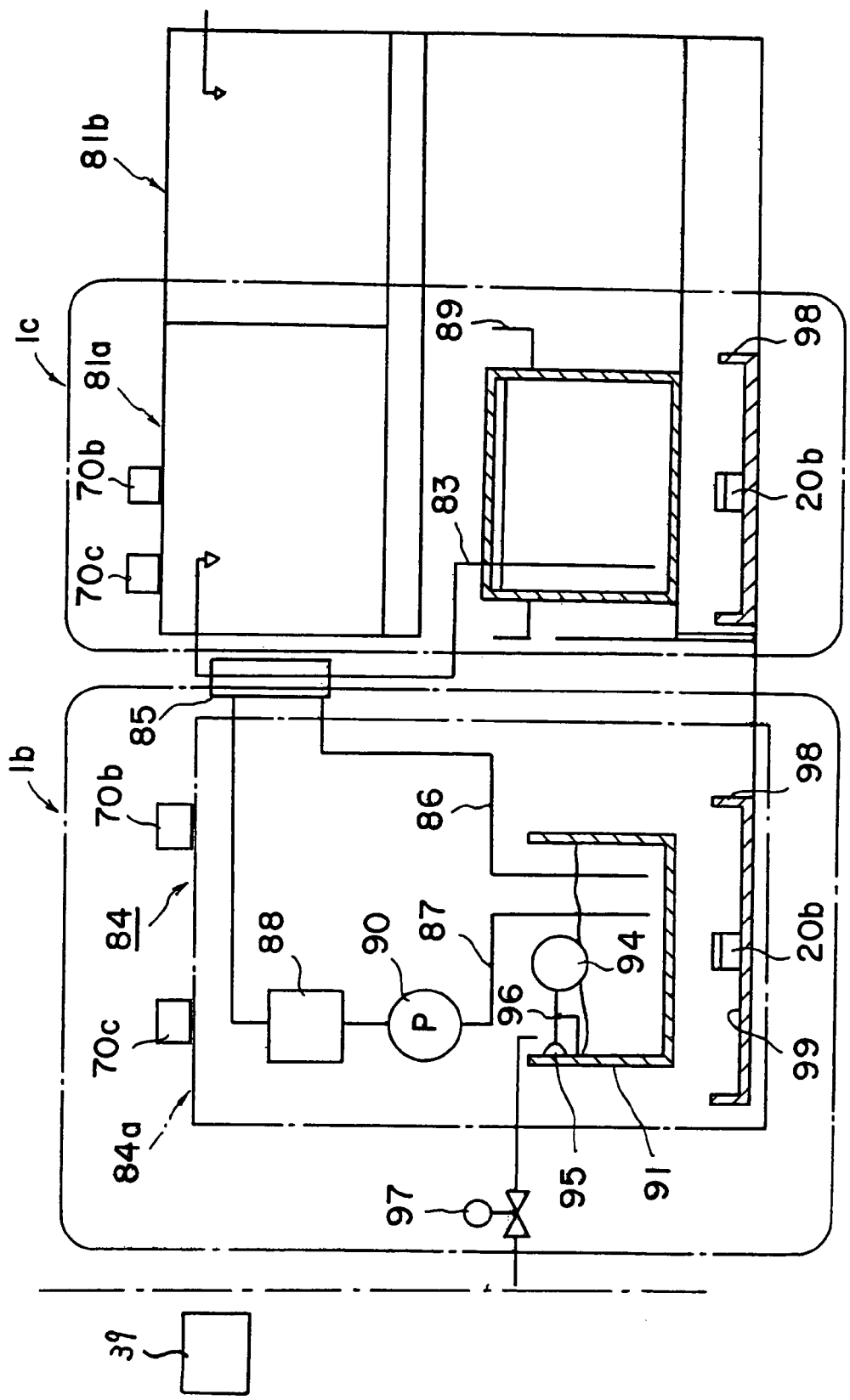
FIG. 7 depicts a block diagram of a mechanical structure showing an explosion-proof type liquid leakage detecting system 1b for the present invention.
Figure 8:
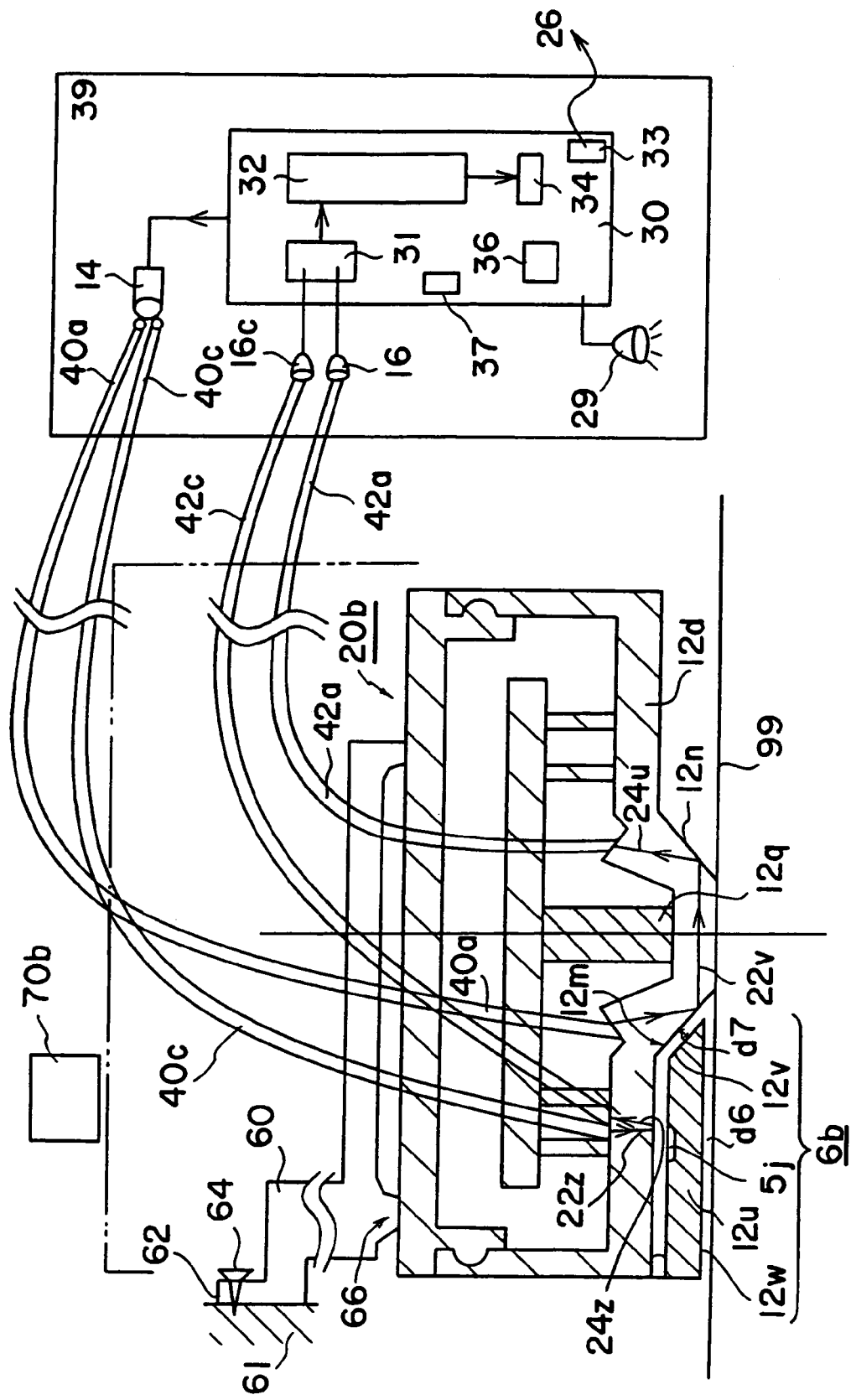
FIG. 8 depicts an exemplary detecting portion of a leaking liquid in an explosion-proof type sensor installed separately between a sensor head 20b and a warning means 70b.
Figure 9:
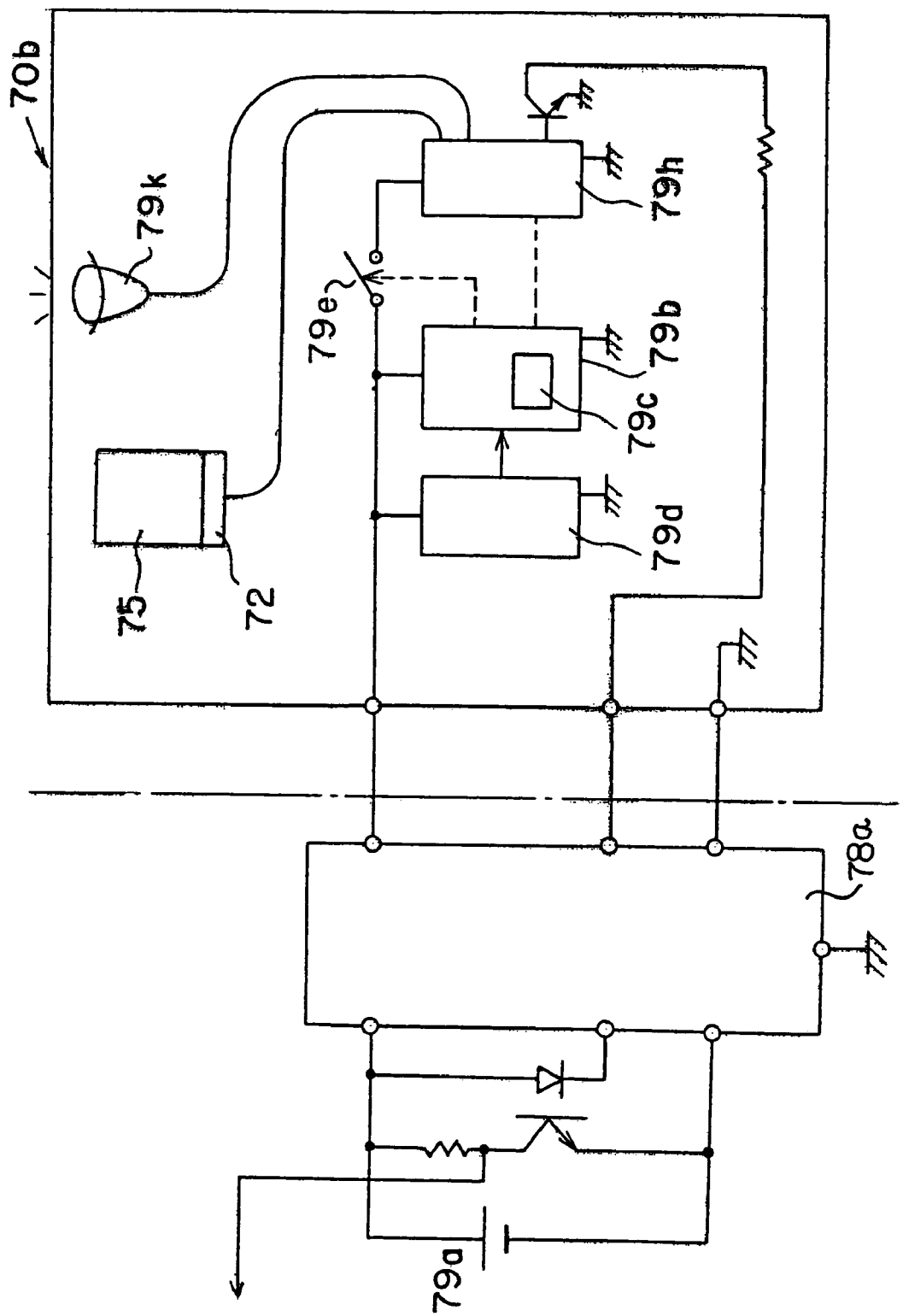
FIG. 9 depicts a block diagram of a signal processing for the explosion-proof type warning means 70b for the present invention.

FIG. 5 depicts an enlarged sectional view showing a principle of a high-speed liquid sucking means 6 for the present invention;

FIG. 6 depicts a block diagram of a signal processing in the liquid leakage sensor 20a for the present invention;

FIG. 7 depicts a block diagram of a mechanical structure showing an explosion-proof type liquid leakage detecting system 1b for the present invention;

FIG. 8 depicts an exemplary detecting portion (a sensing portion) of a leaking liquid in an explosion-proof type sensor installed separately between a liquid leakage sensor 20b and a warning means 70b including a sound producing means; and FIG. 9 depicts a block diagram of a signal processing for the explosion-proof type warning means 70b for the present invention.

<Embodiment 1>

A liquid leakage detecting system of the present invention will be explained with reference to FIGS. 1 to 6 in a following application for a coating and developing equipment of a semiconductor wafer (hereinafter called a wafer).

At first, FIG. 1 shows an embodiment of a liquid leakage detecting system 1a of the present invention wherein a detecting portion of a leaking liquid (a sensing portion of a leaking liquid) 20a is installed in the liquid leakage detecting system 1a and integrally formed with a liquid leakage sensor 20a and a warning means 70a including a sound producing means 72. The detecting portion 20a is comprised at least one liquid leakage sensor including at least one detecting portion contactable with a leaked liquid through a gas layer or a leaking-liquid permeable layer. (In FIG. 1, the detecting portion is made from an optical detecting portion including at least one optically reflecting boundary plane. It can also be made from an electrical detecting portion including a pair of the electrodes measuring impedance changes between the electrodes contacted with a non-insulating liquid. Or it can be made from a flow-measuring type detecting portion.) (Further, in the example of FIG. 1, one liquid leakage sensor is installed in the system, but for a widely-spread sensing area, plural liquid leakage sensors can be distributed at the same bottom surface or the same floor surface.) The liquid leakage sensor 20a can be installed at the bottom surface 99 of each liquid storing vessel 98 described later wherein each liquid storing vessel should be separately discriminated and spatially identified by a manager/maintenance operator for the system. The warning means 70a including a sound producing means described later can be installed within a specified spatial distance (an upward space of the bottom face of the liquid storing vessel 98) from the installation position of each sensor. After detecting any abnormal conditions of the sensor 20a (an error-detection of a leaking liquid or an error-detection of a mal-installation of a sensor), the installation position of the error-activated sensor can be alarmed at least from a sound producing means in a form of an audio frequency in order to easily and directly identify the installation position of the error-activated sensor by discriminating this activated sensor from other non-activated sensors installed at the outside of the specified spatial distance from the error-activated sensor (so as to independently identify each liquid storing vessel respectively). For the example depicted in FIG. 1, the liquid leakage sensor 20a and the warning means 70a are connected with each other by a pair of signal lines, integrally formed, and finally installed at the same spatial position.

The above coating and developing equipment of a wafer is generally consisting of a processing mechanical unit having plural processing mechanism for performing various processings with the wafer, and a conveying mechanism for carrying-in and carrying-out the wafer to and from the processing mechanical unit. In the conveying mechanism, the following mechanism and members are included, that is, a wafer carrier for storing the wafer before several processing, another wafer carrier for storing the wafer after the several processing, an adsorption arm for holding the wafer during the several processings, a transfer mechanism of the arm for an X-direction, a transfer mechanism of the arm for a Y-direction, a rotating mechanism of the arm at a θ-axis, and a mounting table for handling the wafer to and from the processing mechanical unit. Further, in the processing mechanical unit described above, the following plural mechanism and members are included, that is, an adhesion coating mechanism for taking pre-treatment for improving the adhesion property between a wafer and a resist film, a coating mechanism 81a for coating the upper surface of a wafer with a resist liquid, a cooling mechanism for cooling a wafer and adjusting a temperature of the wafer within a given range before coating the wafer with the resist liquid by the coating mechanism 81a, a baking mechanism for heating a wafer in order to evaporate a solvent left within the resist film coated on the wafer, and a developing mechanism 81b for developing the resist after an exposure. Furthermore, in the processing mechanical unit, the conveying mechanism having an arm for carrying a wafer to and from the above processing mechanisms 81a, 81b, etc. is installed along a transmission route. In the above mentioned structure of the processing mechanical unit, a wafer carried-in from the conveying mechanism is pre-treated by the adhesion coating mechanism, then cooled by the cooling mechanism and coated by the coating mechanism. Further, the wafer is heated by the baking mechanism, and developed by the developing mechanism 81b. Thereafter, the wafer is taken out to the conveying mechanism, and stored into a wafer carrier. In these structures, the processing liquid, i.e., a resist liquid is supplied from a liquid tank 82 having the liquid leakage detecting system 1a of the present invention to the resist coating mechanism 81a.

A layout of the liquid tank 82 and a thermo-controller 84 in a semiconductor wafer processing equipment is shown in FIG. 1, and the liquid leakage detecting system 1a are installed in each of the liquid tank 82 and the thermo-controller 84 respectively. A conduit 83 delivered from the liquid tank 82 is connected to the coating mechanism 81a, and a liquid leakage sensor can be also installed at an outer vessel 89 placed around the upper portion of the liquid tank 82. A temperature control unit 85 is installed in the conduit 83, and keeping the processing liquid supplied to the coating mechanism 81a at a constant temperature. A constant-temperature water is circulated and supplied to the temperature control unit 85 in order to keep another liquid at a constant temperature based on a temperature adjusting unit 84a. A thermo-control portion 84 is consisting of the temperature adjusting unit 84a and the temperature control unit 85, wherein the temperature adjusting unit 84a is consisting of a constant-temperature water tank 91, a sending conduit 87 having a pump 90 and a thermo module 88, and a return conduit 86, etc, and the temperature control unit 85 is functioning as a heat exchanger. In the thermo module 88 not shown in detail, the temperature adjusting water can be held at a constant temperature through energizing an electric control-current in it.

A float 94 is attached to the constant-temperature water tank 91 in order to detect a liquid level, and an electric contact 96 is engaged near its support portion 95. This electric contact 96 is controllably connected to a solenoid valve 97 through un-illustrated logic circuit. Each liquid storing vessel 98 is independently placed below this constant-temperature water tank 91 and the liquid tank 82 respectively. Each liquid leakage sensor 20a for detecting a leaking liquid is independently installed at the bottom portion 99 of these liquid storing pans 98 in order to be enabled to uniquely identify each storing vessel independently.

The un-illustrated logic circuit described above is provided in order to control the solenoid valve 97 opening and supply a liquid for the temperature control (hereinafter called a temperature adjusting liquid) according to a decrement of the liquid. A selector switch is used to switch between an automatic supply and a manual supply of the temperature adjusting liquid. When a contact of the switch is connected to the right-hand side, the solenoid valve 97 is energized by an electric current, then opened, and the temperature adjusting liquid is manually supplied and filled. In case of a left side connection of the contact, the temperature adjusting liquid is automatically supplied.

When a liquid level of the tank 91 is going downward, the float 94 is also going down and the contact 96 is turned on. At this time, an input of an inverter A1 becomes zero, and the output of the inverter A1 becomes one (a H-level of a positive logic). The output of the inverter A1 is transmitted to inverters A2 and A3 through respective delay circuits D1 and D2. However, the delay circuit D1 has a delay time of about one minute, and the delay circuit D2 has a delay time of about two seconds. Accordingly, at about two seconds later after the contact 96 is turned on, a signal 1 is fed to the output of an inverter A4, therefore a transistor Tr is turned on and the electric current is fed to the solenoid valve 97. Further, after about one minute later, the output of the inverter A2 becomes zero, therefore the transistor Tr is again turned off and the electric current of the solenoid valve 97 is cut-off. Each diode is attached to respective delay circuits D1, D2, and these delay circuits D1, D2 function as a signal-delay element from a signal 0 to a signal 1 transition, but function as a simple transmitter from a signal 1 to a signal 0 change without delay. Consequently, according to the delay circuit D1, the solenoid valve 97 is prevented from opening more than one minute. According to the delay circuit D2, the solenoid valve 97 is prevented from frequently repeating between turn-on and turn-off transition based on a liquid level ruffling, etc.

FIG. 2 shows an enlarged embodiment of the present invention wherein an optical liquid leakage sensor (a sensing portion of a leaking liquid is comprised with an optical light-reflecting plane) 20a is integrally formed with a warning means 70a including a sound producing means. Further, the liquid leakage sensor 20a has an integrally formed sensor-case 12 containing a light source 14a and the photo-detection means 16 and consisting of a transparent or translucent member at a bottom portion 12d, and furthermore has a case holder 5 mounted at the bottom edge portion of the case 12. The liquid leakage sensor 20a is installed and fixed at a sensing bottom surface (this surface includes a floor surface when the leakage sensor is directly installed at the floor surface of a building, etc.) 99 of the liquid storing vessel 98 by a fixing member such as a screw, a nail, etc. or another un-illustrated fixing means, the leakage sensor 20a is fixed at a specified detecting portion of the vessel 98. And at least one high-speed liquid sucking means 6 described later is additionally attached to the sensor in order to rapidly suck a small quantity of a leaking liquid from the floor surface 99 to the liquid sensing spot of the boundary surface on the light-reflection plane, even in case of a thin layer liquid having a low surface tension of $6 \times 10^{-2}$ N/m or less at 20° C. The high-speed liquid sucking means 6 is formed from an air gap portion (for example, the air gap portion is made from a parallel air gap portion having a clearance of 1 mm or less, and/or a wedge-shaped air gap portion having a maximum clearance of 1 mm or less and gradually narrowed toward the upper portion) enabled to manifest a capillary phenomenon of a given clearance having a specified sectional shape. According to liquid sucking means 6, even a small amount of a thin layer liquid can be rapidly sucked from a sensing floor to a leakage detecting level against a gravity force, and directly fed to the optical sensing spot on the reflection boundary plane.

Further, the case bottom portion 12d is made from a transparent or translucent material selected from a group of a thermoplastic resin such as ABS resin, polyethylene, polyvinyl chloride, polystyrene, polypropylene, polyvinyl alcohol, methacrylic resin, petroleum resin, polyamide, polyvinylidene chloride, polycarbonate, polyacetal, fluororesin, polyimide, polyether ester ketone, polyphenylene sulfide, polybenzimidazole, polycycloolefin, etc., or thermosetting resin such as phenol resin, urea resin, unsaturated polyester, polyurethane, alkyd resin, melamine resin, epoxy resin, etc., i.e., a synthetic resin member/plastic member of thermoplastic resin or thermosetting resin, etc., or a biodegradable resin member of a mixture, etc. of polyamino acids, aliphatic polyester, poly-ε-caprolactam, polyvinyl alcohol, chitosan, starch, cellulose, etc. and general purpose polymer, or a combination of these materials, or furthermore, including at least one of an engineering plastic member such as poloyamide, polycarbonate, polyacetal, polyethylene terephthalate, polybuthylene terephthalate, polyphenylene ether, polyether ester ketone, polyphenylene sulfide, polyallylate, polysulfone, polyether sulfone, polyketone sulfide, polyether imide, polyamide imide, polyimide, polytetrafluoroethylene, aromatic polyester, polyaminobismaleimide, triazine resin, etc., or glass or ceramics.

One end of the liquid sensing portion of the sensor is projected downward, and the case bottom portion 12d having the convex form as shown in FIG. 5 is placed directly on the liquid detecting bottom surface 99 of the liquid storing vessel 98, and a bottom face 12p can be closely contactable with the liquid detecting bottom surface 99.

As for the liquid sensing portion, each total reflection plane 12m and 12n is formed respectively for detecting a leaking liquid on a plane having a specified tilt angle of about 35 to 50 degrees corresponding to the liquid detecting bottom surface (or the floor surface) 99. These planar total reflection planes 12m and 12n are functioning such that the extensions of the total reflection planes mutually cross at a specified angle in order to form a kind of a corner cube. At least one light source, a light receiving means and a control means connected to these means are placed at the same side referring to each of the total reflection plane described above respectively. A light is projected from the light source to the first total reflection plane 12m, and the light reflected on the first total reflection plane 12m is transmitted to the second total reflection plane 12n. The light reflected on the second total reflection plane 12n is received into the light receiving means, and its output is processed by the control means in order to detect a leaking liquid.

Therefore, in a first optical system for detecting a liquid leakage, a detecting light 22u from the light source 14a is at first projected onto the total reflection plane 12m at a given incident angle according to the refractive index of the transparent or translucent material 12d such that this light 22u is totally reflected on the total reflection plane 12m from above to sideways at a specified critical angle or more. Its reflection light 22v is projected onto the total reflection plane 12n. The total reflection light 24u on the total reflection plane 12n is received into the photo-detecting means 16 based on a photoelectric converting element consisting of a CCD, a MOS type photodiode, etc. at a specified light receiving angle according to the refractive index of the transparent or translucent material 12d. After propagating through the first optical system, the detecting light of a leaking liquid is converted into an electric signal. For example, its electric output is converted into a digital signal by an A/D converter 32 at every specified sampling period through a multiplexer 31 as shown in FIG. 6. This digital signal is sequentially written into a buffer memory 34 and digitally processed in the control means 30 including a microprocessor (MPU) 36 and doubly used as the detecting means of a leaking liquid 18. Further, an analog output of the photo-detecting means 16 is directly inputted to an analog processing means consisting of an analog comparator (not-shown), etc., and compared with a given reference level in the analog control means 30 and analog detecting means 18. Thus, the sensing of a leaking liquid can be also done analogically based on a magnitude of the amount of the reflected light.

After processing the received light, the detecting information of a leaking liquid in the liquid leakage sensor 20a is digitally issued as an external output through an external output setting device 33 and a pair of signal lines 26 (in the format of a PNP output or an NPN output specified by a dip-switch, etc. in the external output setting device 33). Further, the detecting information is also issued to a warning means 70a including at least one of a sound producing means 72 independently enabled to operate from the external output information. As for the sound producing means 72, it includes, for example, means for producing a sound based on striking a resonating body, and/or sound producing means including a whistle or a siren, and/or means for producing a sound based on a vibration (e.g., a piezoelectric buzzer, etc.), and/or means for producing a sound based on a vibration and a resonator connected to it. Further, in the warning means 70a, a warning lamp 29 is also preferably attached to it. According to these warning means, the location of error-detecting sensor is directly warned or informed for a maintenance operator to separately discriminate said activated sensor from the other non-activated sensors and spatially identify uniquely said activated sensor even for a beginner through approaching to the emitting sounds in a form of an audio frequency.

As for the light source/light projecting means described above, it can be used such as an LED, an infrared light emitting element, a semiconductor laser, an optical fiber for the light projection, etc. Further, in the liquid leakage detecting system 1a wherein the liquid leakage sensor 20a is integrally formed with the warning means 70a including the sound producing means 72, it is preferable to integrally form and firmly fix each element described above into a circuit substrate 7, in which the light source 14a, the light receiving means 16, the warning lamp 29, the leakage detecting means 18, a control portion 700 of the warning means 70a in order to control a driving power supplied for the sound producing means 72, and/or the control means 30, etc. are integrated into the circuit substrate 7 used as a shading light material. It is preferable to install a wired or wireless communicating means 702 in the electric control portion 700 of the warning means 70a. Based on the communicating means 702, it is preferable to transmit a control command of the sound producing means from a remote site in order to enable an on-off control, a sound volume control, or a reset control of the sound producing means 72. According to these remote commands, the maintaining and restoring operations can be done reliably/rapidly after detecting the leaking liquid.

The electric control portion 700 of the warning means 70a can be replaced by the control means 30, and its fixing base 71 is fixed on the circuit substrate 7 by a fixture such as a screw. On the upper-surface of the fixing base 71, the sound producing means 72 consisting of a piezo-electric vibrating element (e.g., a piezoelectric vibrating element PKLCS1212E4001-R1 of Murata Seisakusho, Co., Ltd. located in Kyoto prefecture in Japan), etc. is engaged at a specified position with a vibration-enabled state. A vibration transmitting plane 74 is formed on the inside lower plane of a hollow lower portion on the upper surface of the sound producing means 72. A cylindrical shell 73 is integrally formed through a fitting convex portion 78 formed in a lower end periphery of the warning means 70a with a fitting concave groove formed in an upper periphery of the optical leakage sensor 20a in order to be detachably attached to each other in one touch operation. The hollow upper portion of the cylindrical shell 73 forms a resonator 75 of the sound producing means 72 together with a cover portion 76. Further, on the side-wall of the hollow upper cylindrical shell 73 and/or the cover portion 76, a single or plural window portions 77 are formed for emitting a resonating sound of the sound producing means 72. It is more preferable to form the window portions 77 described above on the side wall of the shell body 73 rather than the upper surface of it in order to prevent the leaking liquid from directly flowing into the resonator 75.

Further, the resonator 75 is preferably made from a transparent and/or translucent material in order to be directly observable externally to verify a turning-on state of the warning lamp 29 attached at the upper surface of the circuit substrate 7.

In the embodiment described above, the warning means 70a is integrally formed only in the case 12 of the sensor main body. However, as for the warning means 70a, a vibrating source/vibrating portion of the sound producing means can be formed only in the holder 5, or can be split and formed into two parts between the case and the holder. Further, the resonating means/resonator can be formed only in the case 12, or formed only in the holder 5, or can be split and formed into two parts between the case and the holder. Furthermore, as described later, the warning means can be separately placed on a specified upper spatial position different from the installation position of the leakage sensor head through a wired and/or wireless communicating means.

It is preferable for the resonating means/resonator to split and form into the two parts between the case 12 and the holder 5 in order to reduce unnecessary high-volume sounds emitted from the warning means during the repairing period while detaching the main body case 12 from the holder 5 after checking/detecting a leaking liquid.

Next, a second optical system is installed independently in order to detect mal-installation conditions different from the first optical system described above for detecting a leaking liquid. In the second optical system, a detecting means 4 for mal-installation conditions is formed in order to check a parallelism between the case 12 and the bottom surface 99 of a leakage sensing plane whether any floating/tilting angle can be formed between them or not. Therefore, a projected light from a light source 14c is refracted and transmitted through the case bottom portion 12d and projected onto a thin paper 8 used as consumables from the upper space. A protruding portion 5h is formed integrally with a ring-shaped frame body 5a toward the central direction of the inside ring in the inner periphery of the frame body 5a having a hollow portion of the holder 5. A thin paper mounting plane 5j made from a light-absorbing/a light-transmissive material is formed on the upper surface of this protruding portion 5h. A part of the thin paper 8 is mounted on the plane 5j. Therefore, a light 22z is refracted into the case bottom portion 12d at an incident angle less than a critical angle of it, and projected onto the thin paper 8 forming a third optical reflection (boundary) plane. The reflected light 24z from the paper is received into a photo-detecting means 16c. Then, like as a similar way described above, this reflected light 24z is converted into an electric signal and inputted to the control means 30. It is preferable to fill in a space formed between the light source 14c and the light receiving means 16c with a shading light material 12q in order to prevent the light on the light source 14c from directly receiving into the light receiving means 16c. It is also preferable to fill in a space formed between the first optical system and the second optical system described above with another shading light material 12q in order to optically separate each other.

The control means 30 can be multi-purposely functioned such as a sensing means (a detecting means) of a leaking liquid, a detecting means for mal-installation conditions of the sensor case, and the control portion 700 of a warning means 70a. Further, in the example described above, the detecting means 4 formal-installation conditions is embodied in an optical type detecting means in order to check the parallelism between the case 12 and the bottom surface (or floor surface) 99. Moreover, the detecting means 4 can be embodied in a magnet type detecting means or an electrostatic capacity type detecting means.

A shading light material such as a metallic foil, etc. can be adhered to the inner portion of the case bottom 12d. When the shading light material is laid out at the inner bottom portion of the case except for the light passing area such as a projecting light area and a reflected light area near the light receiving means, it has an optical effect wherein an unnecessary light reflected from the floor surface can be shielded from a light receiving means even after a leaking liquid spreads over the floor surface made by a white color paint or a mirror finished surface. Further, a sensing result of the leaking liquid or an error information about a mal-installation of the sensor processed in the control means 30 are externally issued through a pair of signal lines 26 in a form of electric signals, and at the same time, warned and displayed on a display means 29 attached to the upper surface of the circuit substrate 7 in the case 12 based on a dual-lighting LED between a green color and a red color.

As for the holder 5, the size of an outer diameter can be preferably set 1.3 times larger than that of the case 12 in order to prevent an overturning of the sensor 20a. In case of using a firmly bending cable 26, after setting up the sensor on a floor without a support, the case 12 is easily overturned. Normally, before inserting the case 12 into the holder 5, the holder 5 is firmly fixed at the bottom surface 99 by a fixing member such as a screw, etc. Further, in order to prevent the overturning of the sensor, a presser bar arm 60 can be extended from a side wall of a building. One end portion 62 of the presser can be fixed to the building 61 by a fixing member 64 such as a screw, a nail, etc. And the other end portion 66 can be pressured on a side portion of the case 12.

It is preferable to be formed with an adjustable setting for the distance d4 between the case bottom 12d and the sensing bottom surface 99 of a floor, according to the viscosity/surface tension of the detecting liquid. However, when the angle/distance between the reflection boundary planes 12m, 12n and the sensing bottom surface 99 is fluttered by an earthquake or the movement of a heavy load, these fluctuations can easily cause a measuring error in the detecting operation of the liquid leakage sensor. Therefore, it is preferable to have a vibration-free structure and hold a constant distance d4 between the case bottom and the floor surface, even under external vibrations. Further, it is preferable to form a detachably attached structure between the holder 5 and the case 12 in one touch operation described later. The holder 5 composed of a shading light material has an effect for preventing a noise/unnecessary light from receiving into the sensor around the case 12 or the floor surface. In case of installing the case 12 without the holder 5 as an independent sensor, it is preferable to fix the case at a floor surface 99 with an extended presser bar 60 fastened to one end to a wall in order to prevent the distance d4 from fluttering under external vibrations. It is preferable to integrally form and secure the light source 14c, the light receiving means 16c, and the display means 29, etc. to the circuit substrate 7 doubly used as a shading light material.

As for the total reflection plane 12m, the spotting position of the projected light 22u is preferably concentrated on a downward portion near the liquid detecting bottom surface 99. A projecting portion formed at the case bottom and having a convex part including a bottom face 12p can be used as a hold-down device closely contact with a thin paper 8 having cutting stripes 8d as shown in FIG. 4C and formed at specified places of the paper 8. It is preferable to fill/form the space between the light source 14a and the light receiving means 16 with the shading light material 12q in order to prevent the projected light to be directly incident from the light source 14a to the light receiving means 16.

Figure 4:
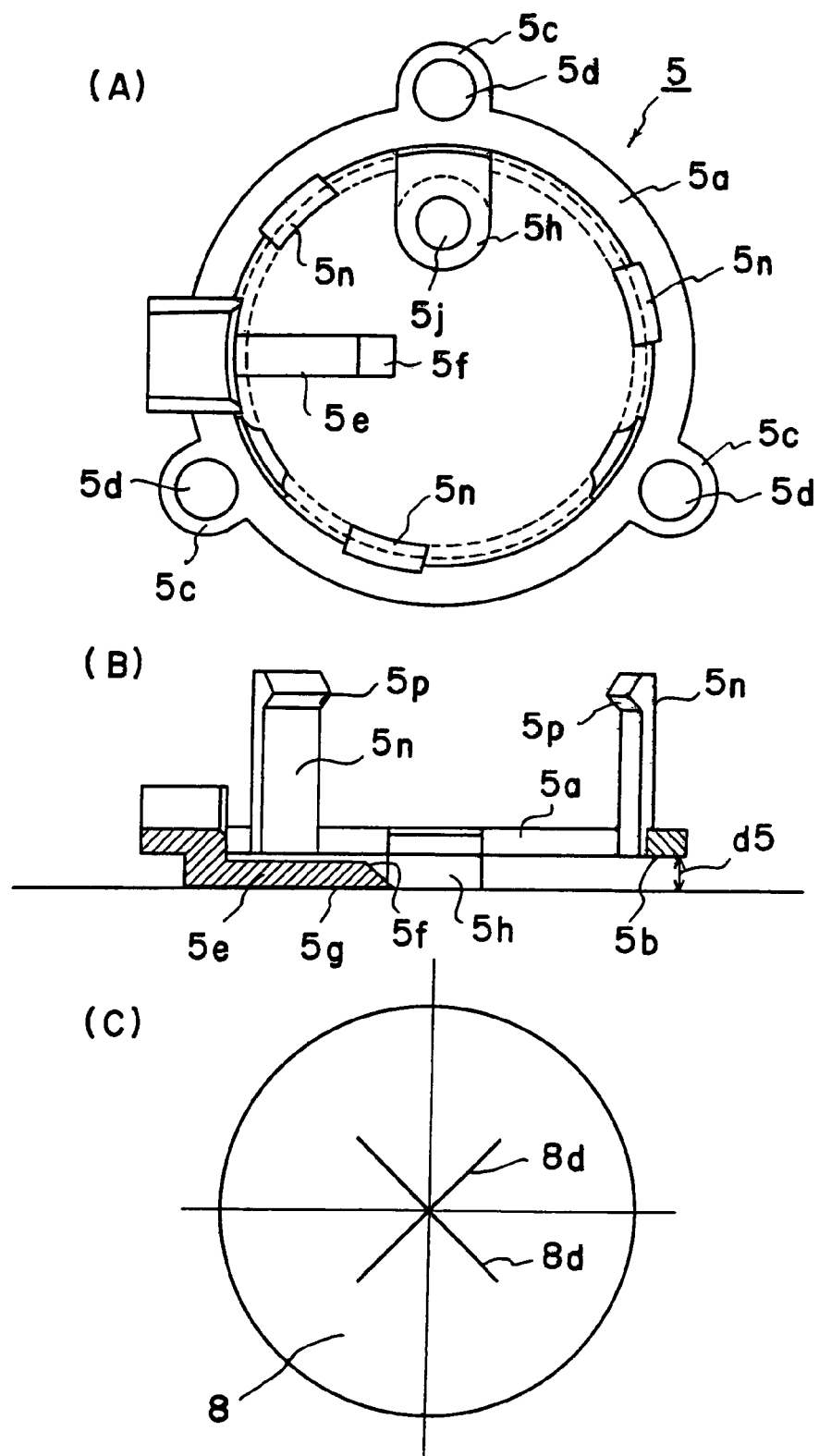
FIG. 4 depicts an exemplary structure of a holder 5 for the present invention.

The whole of the case 12 is inserted/mounted into a central hollow portion of the holder 5 (FIGS. 4A and 4B) composed of a ring-shaped frame body 5a, then fitted and fixed to it (FIG. 2). The bottom face 5b (FIG. 4B) of the frame body 5a opposed to the bottom surface 99 is formed approximately in parallel with holding a given distance d5 (normally, an air gap distance is preferably in the 2 mm to 5 mm range) from the sensing bottom surface 99. As for the bottom portion 12d of the case 12 (FIGS. 2B and 5), the detecting portion of leaking liquid is projected into the convex form wherein the thin paper 8 can be held between the bottom face 12p and the sensing bottom surface 99, and directly contactable closely with a leaking liquid. According to the projecting bottom portion of the case 12, a leaking liquid 2a having a low surface tension and diffusing with a thin film layer over the liquid sensing bottom surface 99 can be directly detected from the central hollow portion of the bottom surface 99. The holder 5 can be fixed to the bottom surface 99 with a fixing member such as a nail/a screw, etc. through a penetration 5d formed at a radial projection or plural ones 5c around the periphery of the ring. The holder 5 also can be closely adhered to the bottom surface 99 with pasted adhesives at the fan-shaped bottom face of the projecting body 5c (FIG. 4). Or, the holder 5 can be simply mounted slidably on the bottom surface 99 without fixation. Further, in order to prevent the overturning of the case 12, a presser bar arm 60 can be extended from a sidewall or side face 61 of a building or equipment wherein one end portion 62 of the presser can be fixed to the building 61 with a fixing member 64 (FIG. 8), and the other end 66 can be pressured on a side portion of the case 12.

Further, in the embodiment of FIG. 2, the light source 14a, 14c and the light receiving means 16, 16c are integrally formed into the case whose bottom portion 12d is made from a transparent or translucent material wherein the high-speed sucking means 6 is made from the members composing the case 12 and its mounting holder 5. As for the structure of the sucking means 6 (FIG. 5), for example, in an inside perimeter of a frame 5a, a rectangular parallelopiped protruding portion 5e having a leading edge-like wedge 5f is integrally formed radially with the frame body 5a toward the ring center. The protruding portion 5e is preferably composed of an absorber/a light-transmitting material of the projected light for detecting a leaking liquid wherein a bottom face 5g of the protruding portion 5e can be held in non-contactable state with the bottom surface 99, and form an air gap portion d6 parallel to the surface 99 with a given clearance d6=1 mm or less (preferably 0.9 mm or less, more preferably 0.5 mm or less). Based on capillary action through the air gap d6, the leaking liquid 2a having a low surface tension of $6\times10^{-2}$ N/m or less at 20° C. is very rapidly diffused along the bottom face 5g opposite to the bottom surface 99. Further, at the leading edge 5f of the protruding portion 5e located at one end of the bottom face 5g, an air gap portion d7 parallel to the total reflection plane 12m with a given clearance d7=1 mm or less (preferably, 0.9 mm or less, more preferably, 0.5 mm or less) is formed between the leading edge 5f and the total reflection plane 12m of the case 12, and/or a wedge-like air gap portion d7 gradually narrowed upwardly with a maximum clearance d7=1 mm or less (preferably, 0.9 mm or less, more preferably, 0.5 mm or less) at the lowermost end is formed between the leading edge 5f and the total reflection plane 12m of the case 12. Based on capillary phenomenon through the wedge-like air gap d7, the leaking liquid 2a having a low surface tension of $6\times10^{-2}$ N/m or less at 20° C. can be very rapidly sucked up from the bottom surface 99 over a specified detecting spot on the reflection boundary plane 12m against the gravity even with a small amount of the liquid. A part of the thin paper 8 having a cutting stripe 8d can be inserted into the air gap d7. According to an experiment, a detecting speed of the leaking liquid 2a having the low surface tension is nearly about the same speed whether the thin paper 8 is interposed into the air gap d7 or not. Further, the whole of the case 12 is fitted and rotatably held through inserting/mounting to plural engaging portions 5n setting up on the upper surface around the inner annular ring-shaped frame 5a (FIGS. 2A and 2B). Each tapered face is formed diagonally upward on the upper end portion 5p of respective engaging portion 5n, and it is preferable to form in a one-touch dismountable structure between the case 12 and the holder 5 (FIG. 4B).

Based on these structures described above, its operation of the liquid leakage sensor 20a will be explained with reference to FIGS. 3C and 5. At first, when the case 12 is not firmly fixed through the holder 5 or the presser 60 to the bottom surface 99, a gap is formed between the case 12 and the holder 5, or the case 12 is inclined/overturned, therefore an abnormal condition concerning to installing the case 12 is invited, and the light transmitting path from the projecting light 22z to the reflected light 24z in the optical detecting means 4 is not formed at the normal optical positions. Therefore, the light 22z projected from the light source 14c cannot be reached onto the reflection plane (thin paper 8), and can be transmitted and diffused into a gas layer such as an air through the optical boundary plane 12a of the main portion 12d. Or the light 22z can be projected onto the thin paper 8 with more than a specified angle of refraction, and the reflected light 24z from it can be hardly received into the light receiving means 16c. Therefore in the detecting means 18, a drastically decreased output of the receiving means 16c can be compared with a normal output level of the reflection light, and easily detected a mal-installation condition of the sensor 20a, then a mal-installation alarm signal (or error code ER-A) is externally issued from control means 30 including MPU etc. through the cable 26 in the digital format according to PNP-output or NPN-output specified by an external output setting device 33, and further based on a power controller not-shown in the drawings, a power supply to light source 14a, 14c and light receiving means 16, 16c can be stopped, and the liquid leakage sensor 20a is held into a error-waiting state.

At this moment, another warning signal different from the external output described above is issued from mal-installation detecting means 4 to the warning means 70a independently in order to start alarming the error detection via an audio frequency sound. Then, in the warning means 70a, after receiving the warning signal, vibrations produced in the sound producing means 72 are amplified through the resonator 75, and emitted into the air space. Therefore, an operator (who is normally waiting for in a maintenance room, etc.) warned with the mal-installation alarm signal through cable 26 can rapidly go to the error-detected area, and directly find out where is the mal-installation sensor is placed and very easily discriminate and uniquely identify the mal-installation sensor from the other located sensors through approaching closely to the warning device emitting the audio frequency sounds based on the sound producing means 72 through resonator 75 without searching for or checking each floor surface or each bottom surface of the liquid vessel respectively such as a conventional operation. Moreover, the warning sounds emitted from the sound producing means 72 through the resonator 75 can be used in a form of an intermittent and/or continuous sound of a constant or variable frequency, an intermittent and/or continuous sound of a constant or variable tone color, an intermittent and/or continuous sound of a constant or variable sound intensity, an intermittent and/or continuous sound of a constant or variable sound pitch, and an intermittent and/or continuous sound of a constant or variable duty ratio, or combinations thereof.

Further, in the warning means 70a, the warning light/display means 29 can be turned on as an error light (red color). Besides, the intensity of the warning light 29 can be also changed according to a variation of the warning sound emitted from the sound producing means 72 in the form of audio frequency. In the correspondence between the warning sound and the warning light, the intensity of light, or a light wavelength, etc. can be changed in synchronization with the variation of the warning sound, or can be changed independently each other.

In a normal installation condition without any mal-installation warning signals described above, the electric power is supplied from a power control portion to the light source 14a, 14c and the light receiving means 16, 16c, then the liquid leakage sensor 20a is activated into an operating state. In case of no leaking liquids, the optical path from the projected light 22z to the reflected light 24z in the optical mal-installation detecting means 4 is formed at the normal optical position as shown in FIG. 3C. Therefore, the projecting light 22z from the light source 14c is reflected on the surface of the reflecting member (thin paper 8) placed on the holder bottom surface 5j. The reflected light 24z is received into the light receiving means 16c, and its output is compared with the normal level of the reflected light in the detecting means 18. Thus, the normal installation conditions of the liquid leakage sensor 20a are easily detected.

The projecting light 22u from the light source 14a forming a part of the optical system for the liquid leakage detection is incident onto the first total reflection plane 12m at a specified angle of incidence according to the refractive index of the transparent or translucent material 12d so as to totally reflect the projecting light 22u from upward to sideways on the total reflection plane 12m at a specified critical angle of incidence or more. The total reflected light 22v is projected to the second total reflection plane 12n. The total reflected light 24u on the total reflection plane 12n is received into the light receiving means 16 at a specified light-receiving angle according to the refractive index of the transparent or translucent material 12d. The leakage detecting light propagated through such an optical path is converted into an electric signal through a photoelectric converting element, and its output is processed in the control means 30 doubly used as the detecting means 18, for example, digitally. Or, an analog output of the light receiving means 16 is directly inputted to an analog processing means consisting of an analog comparator, etc., and is analogically processed in the control means 30 doubly used as the detecting means 18 composed by analog circuits. Moreover, when no leaking liquids exist, a normal amount of the received light is observed at the light receiving means described above, and no decreasing phenomenon of the amount of received light is observed.

Next, when the liquid 2a having a low surface tension of $6 \times 10^{-2}$ N/m or less at 20° C. is diffused over the liquid detecting bottom surface 99 in a form of a thin film layer, the liquid 2a having a liquid level d1 is diffusing over until the liquid is reaching to the area of the bottom surface 99 opposed to the bottom face 5g of the rectangular protrusion solid 5e forming one portion of the high-speed liquid sucking means 6. At a time when the liquid 2a is spilt over the bottom surface corresponding to the high-speed sucking means 6, the leaking liquid 2a is rapidly sucked into the parallel air gap portion d6 based on the capillary action (2a1 of FIG. 5), and is in contact with the bottom face 5g through the air gap portion d6 formed between the bottom surface 99 and the bottom face 5g. It is preferable to set up the distance d6 of the air gap to nearly equal to the level d1 of the liquid 2a, or less than the liquid level d1. As a result, the leaking liquid 2a is diffused at high speed along the entire bottom face 5g corresponding to the bottom surface 99.

Thereafter, when the liquid 2a is diffusing along the bottom face 5g of the projecting portion 5e until the lowermost end portion of the edge portion 5f (2a2 of FIG. 5), the liquid 2a is arriving at one end of the parallel air gap portion d7 formed between the total reflection plane 12m of the case 12 and the edge portion 5f. The air gap portion d7 is set up so as to provide the capillary action of the liquid 2a with a given air gap d7. Therefore, even with a small amount of the leaking liquid 2a, the liquid 2a is directly sucked up and spilling rapidly across a specified leakage detecting spot upwardly on the reflection boundary plane 12m from the bottom surface 99 against gravity (2a3 of FIG. 5). Then, when the liquid 2a is passing upwardly at the specified leakage sensing spot on the reflection plane 12m, most of the projected light 22u from the light source 14a is not totally reflected on the total reflection plane 12m, and approximately refracted straightly through the bottom portion 12d and the total reflection plane 12m, and further, refracting into the liquid 2a filled in the air gap portion d7. Furthermore, most of the light 22u is propagating through the rectangular protrusion solid 5e formed with a light-absorbing/a light-transmissive material, and then through the liquid 2a filled into the air gap portion d6 to the bottom surface 99. At the bottom surface 99, the light is reflected and propagating in the opposite direction to the total reflection plane 12n.

Therefore, the amount of a passing light 24u totally reflected on the total reflection plane 12m and then totally reflected on the total reflection plane 12n, and further incident into the light receiving means 16, while forming the optical path for sensing a liquid leakage, is greatly decreased. Thereafter the output of light receiving means 16 is processed in the control means 30 and the leaking liquid 2a can be very rapidly detected at a very early stage with a small amount of the liquid 2a diffusing thinly over the bottom surface 99. On the other hand, when a large amount of liquid 2a having low surface tension starts to overflow on the bottom surface 99 at a time, the periphery of the case 12 is entirely submerged in the liquid 2a, and the specified sensing spot of the leaking liquid on the reflection boundary plane 12n is also submerged in the liquid 2a. Therefore, the projected light 22u from the light source 14a is totally reflected on the total reflection plane 12m, then the totally reflected light 22v is projected on the total reflection plane 12n. But according to the liquid 2a, the totally reflected light 22*v* is not totally reflected on the total reflection plane 12*n*, and immediately refracted through the total reflection plane 12*n*, further, straightly refracted through the liquid 2*a* filled in the air gap portion d4, and diffused or emitted toward the peripheral direction of the case 12, and finally propagated or advanced into the direction having nothing to do with the installation position of the light receiving means 16. As a result, the amount of light 24*u*, which is forming a part of the optical path for detecting the leaking liquid and totally reflected on the totally reflection plane 12*n* and incident into the light receiving means 16, is greatly decreased. Thereafter the output of light receiving means 16 is processed in the control means 30 and the large amount of leaking liquid 2*a* can be very rapidly detected at a very early stage.

After the leaking liquid 2*a* is detected in the control means 30 doubly used as the liquid leakage detecting means 18, the display means 29 is lighted on as an error-lighting (red color) from the normal (green color) lighting. Further, a detecting signal of a leakage is externally issued in a digital output through the pair of cables 26 according to a PNP output or an NPN output based on the external-output setting device 33 (leakage detecting error code ER-B).

At this moment, another warning signal different from the external output described above is issued from the liquid leakage sensing means 18 to the warning means 70*a* independently in order to start alarming the error detection via an audio frequency sound. Then, in the warning means 70*a*, after receiving the warning signal, vibrations produced in the sound producing means 72 are amplified through the resonator 75, and emitted into the air. Therefore, the operator waiting for in the maintenance room and warned with the leakage detection signal ER-B through cable 26 can rapidly go to the leakage-detecting area, and directly find out where is the leakage-detecting sensor is placed and very easily discriminate and uniquely identify the leakage-activated sensor from the other non-activated sensors through approaching closely to the warning device emitting the audio frequency sounds based on the sound producing means 72 through resonator 75 without searching for or checking each floor surface or each bottom surface of the liquid storing vessel respectively such as a conventional operation. Moreover, the warning sounds emitted from the sound producing means 72 through the resonator 75 can be used in a form of an intermittent and/or continuous sound of a constant or variable frequency, an intermittent and/or continuous sound of a constant or variable tone color, an intermittent and/or continuous sound of a constant or variable sound intensity, an intermittent and/or continuous sound of a constant or variable sound pitch, and an intermittent and/or continuous sound of a constant or variable duty ratio, or combinations thereof.

Further, in the warning means 70*a*, the warning light/display means 29 can be turned on as an error-lighting (red color). Besides, the intensity of the warning light 29 can be also changed according to a variation of the warning sounds emitted from the sound producing means 72 in the form of audio frequency. In the correspondence between the warning sound and the warning light, the intensity of light, or a light wavelength, etc. can be changed in synchronization with the variation of the warning sound, or can be changed independently each other.

Further, the warning sound emitted from the sound producing means 72 after a leakage detection is preferably not the same sound emitted after the mal-installation detection, and it is preferable to set different sounds between the leakage detection and the mal-installation detection in order to identify which sensor-error is detected between the leakage error and the mal-installation error based on hearing the emitted warning sounds. As for the different sounds enabling to identify which error is detected between the two, for example, it can be selected from volume differences of the warning sounds between the two, it can be selected from tone differences of the warning sounds between the two, it can be selected from frequency differences of the warning sounds between the two, it can be selected from duty ratio differences of the warning sounds between the two, it can be selected from a continuous sound or an intermittent sound for the warning sound between the two, or combinations thereof.

Next, when a liquid 2 having a surface tension of $6\times10^{-2}$ N/m or more at 20° C. is diffused over the bottom surface 99, the thin paper 8 is inserted into the parallel air gap portion d4 formed between the bottom surface 99 and the case bottom portion 12*d*. Therefore, just after the liquid 2 having a liquid level d3 has been in contact with the outer periphery or a part of the thin paper 8 (FIG. 5), the leaking liquid 2 is permeated/diffused over the entire surface of the thin paper 8, and rapidly sucked into the vicinity of the total reflection plane 12*n* through the thin paper 8. Thus, when the leaking liquid 2 reaches at a specified spot on the reflection boundary plane 12*n* for detecting a leakage, the projected light 22*u* from the light source 14*a* is totally reflected on the total reflection plane 12*m*, and the totally reflected light 22*v* on the plane 12*m* cannot be totally reflected on the total reflection plane 12*n* affected by the liquid 2, and further straightly refracts and propagates through the total reflection plane 12*n*. Furthermore, after refracting through the thin paper 8 containing the liquid 2, the light 22*v* is straightly passing through, and finally reflected on the bottom surface 99. Consequently, the light 22*v* is propagating and advancing into the direction having no relations to the installation position of the light receiving means 16 at all. Therefore, the amount of a passing light 24*u* totally reflected on the total reflection plane 12*n*, and incident into the light receiving means 16, while forming the optical path for sensing a liquid leakage, is greatly decreased. Thereafter the output of light receiving means 16 is processed in the control means 30 and the leaking liquid 2 can be very rapidly detected at a very early stage with a small amount of the liquid diffusing thinly over the bottom surface 99.

When a large amount of liquid 2 starts to overflow at a time, the periphery of the case 12 is entirely submerged into the liquid 2, and the specified sensing spot for the leaking liquid on the reflection boundary plane 12*n* is also submerged into the liquid 2. Therefore, when the total reflection plane 12*m* is submerged in the liquid 2, the projected light 22*u* from the light source 14*a* is not totally reflected on the total reflection plane 12*m*, and straightly refracted through the total reflection plane 12*m*, then through the liquid 2 filled in the air gap portion d7, and further propagated or advanced into the direction having nothing to do with the total reflection plane 12*n*. Or at first, the projected light 22*u* is totally reflected on the total reflection plane 12*m*, then the totally reflected light 22*v* on the total reflection plane 12*m* is projected on the total reflection plane 12*n*. Further according to the liquid 2, the totally reflected light 22*v* is not totally reflected on the total reflection plane 12*n*, and immediately refracted through the total reflection plane 12*n*, furthermore, straightly refracted through the liquid 2 filled in the air gap portion d4, then reflected on the bottom surface 99, and finally propagated or advanced into the directions having nothing to do with the installation position of the light receiving means 16. As a result, in case of overflowing the large amount of liquid 2, the amount of light 24*u*, which is forming a part of the optical path for detecting the leaking liquid and totally reflected on the totally reflection plane 12*n* and incident into the light receiving means 16, is greatly decreased in comparison with no leaking liquid 2. Thereafter the output of light receiving means 16 is processed in the control means 30 and the large amount of leaking liquid 2 can be very rapidly detected at a very early leaking stage.

After detecting the leaking liquid 2*a* or 2 in the control means 30 doubly used as the liquid leakage detecting means 18, the display means 29 is lighted on as an error-lighting, and a detecting signal of a leakage is externally issued in a digital output through the pair of cables 26 (leakage detecting error code ER-B).

At the same time, another warning signal different from the external output described above is issued from the liquid leakage sensing means 18 to the warning means 70*a* in order to start alarming the error detection via an audio frequency sound. Then, after receiving the warning signal described above, vibrations produced in the sound producing means 72 are amplified through the resonator 75, and emitted into the air. Therefore, the operator waiting for in the maintenance room and warned with the leakage detection signal ER-B through cable 26 can rapidly go to the leakage-activated area, and directly find out where is the leakage-activated sensor is placed on and very easily discriminate and uniquely identify the leakage-activated sensor from the other non-activated sensors through approaching closely to the warning sound device emitting the audio frequency sounds based on the sound producing means 72 through resonator 75 without searching for or checking each floor surface or each bottom surface of the liquid storing vessel respectively such as a conventional maintenance operation.

When one-dimensional or two-dimensional array sensor consisting of plural light receiving elements having each different light receiving angle, and arranged at such a position so as to be discriminated respective light receiving position of said reflected light from each other is used as the light receiving means in the above described processing, it is preferable to process following operations with MPU 36, etc. after A/D converted output of each light receiving element is written into a double buffer memory 34.

a) After correcting each sensitivity of light receiving element 28*i* (i=a to n), a light receiving pattern is smoothed by a moving average method, etc.

b1) A peak position in the smoothed light receiving pattern is searched and a leakage detection is determined based on whether this peak position lies within a range having no liquid leakage or not.

b2) The gravity center XG of a brightness distribution of the reflected light amount of the smoothed light receiving pattern R(j) is processed by the following formula and a leakage detection is determined based on whether this gravity center position lies within the range having no liquid leakage or not.

$$XG=\Sigma R(j)\cdot j/\Sigma j (j=1 \text{ to } n) \tag{1}$$

Here, R(j) shows a light receiving level and j shows a light receiving position from 1 to n.

b3) A rising portion, and/or a peak portion, and/or a falling portion, etc., of the received waveform from the reflected light on the leaking liquid is cut out, and registered into a template memory 35, etc. as a leakage template pattern T(j) in advance. The correlation value CR(m) of a similar waveform to this template pattern T(j) is calculated by a correlation operation between T(j) and the smoothed light receiving pattern R(j).

For example, in the light receiving pattern, the correlation value CR(m) calculated at a position m has a given similarity Thcr or more and the position m has a given distance (mth) or more apart (m>mth) from the non-leakage position, it is determined that the leaking liquid is detected at the position m. On the other cases, it is determined that no leakage exists.

c) Thus, when the leaking liquid 2 is detected by the desired calculation or combined calculations from the calculations b1) to b3) in the control means 30 doubly used as the liquid leakage detecting means 18, the error information of the leaking liquid is digitally issued externally through the cable 26 (leakage detecting error code ER-B).

In the processings of b1) or b2) described above, the calculation of detecting the leaking liquid can be done based on a minimum of two light receiving positions (elements) through a light converging means such as a lens, a concave mirror, etc for widely collecting the reflected light. Further, in the correlation calculation of b3), it is preferable to collect the reflected light data at a minimum of 4 to 8 different positions.

Furthermore, since the thin paper 8 used as consumables is inserted between the case 12 and the holder 5 in the liquid leakage sensor 20*a*, the leaking liquid 2 diffusing over the bottom surface 99 is gradually permeated into the thin paper 8 while the thin paper 8 is converted into a transparent layer. When the leaking liquid 2 is diffused up to the mounting plane 5*j* formed on the upper surface of the projecting portion 5*h* around the inside portion of the ring-shaped frame body 5*a*, light 22*z* projected from the case bottom portion 12*d* is not reflected on the surface of the thin paper 8 forming a third optical (reflection) boundary surface, and straightly propagates through the thin paper 8 permeated by the leaking liquid. Then, the light 22*z* straightly refracts with a specified refractive angle into the mounting plane 5*j* formed with a light-absorbing/a light-transmissive material. Consequently, the amount of the light 24*z* reflected on the paper 8 and received into the light receiving means 16*c* is greatly decreased, and the control means 30 doubly used as the mal-installation detecting means 4 of the case is activated by the decreased light, so that the leaking liquid 2 can be also detected as a mal-installation error of the case. Therefore, even when the first optical system for detecting a leaking liquid is broken down and cannot be normally operated, the leaking liquid 2 can be detected as a mal-installation error of the case, consequently the error detecting power of the sensor can be strongly improved.

As a result, the liquid leakage sensor 20*a* shown in FIGS. 2B and 5 is a kind of leakage sensor including at least one reflection boundary plane 12*m*, 12*n* contactable with a leaking liquid through gas layers d6, d7 or a permeable layer (For example, in FIG. 5, the permeable layer is one portion of the thin paper 8 held between the bottom surface 99 of the liquid storing vessel 98 and the underside 12*p* of the case.) to said leaking liquid, the light source 14*a*, the light receiving means 16 and the control means 30 connected to these means. As for a liquid sucking means, through the gas layer d6 or through the liquid permeable layer (d4 or the thin paper 8 held between the bottom surface 99 and the underside 12*p* of the case), a partial or the whole plane opposed to the bottom surface 99 of the vessel 98 is composing a part of the liquid sucking means, and directly opened toward the sensing bottom surface 99 (in FIG. 5, the gas layer d6 is opened entirely toward the bottom surface). Or, the bottom surface 99 is composed as one portion of the gas layer or the liquid permeable layer (in FIG. 5, a part of the thin paper 8 held between the case underside 12*p* and the bottom surface 99). Further, in the liquid leakage sensor 20*a*, at least one high-speed liquid sucking means 6 is provided for directly and rapidly sucking the leaking liquid 2a having a low surface tension of $6 \times 10^{-2}$ N/m or less at 20° C. from the bottom surface 99 of the vessel 98 to the reflection boundary plane 12m against gravity based on the capillary phenomenon introduced through a given clearance d0 and a specified sectional shape of the air gap portion even with a small amount of liquid 2a. So, the light 22u emitted from the light source 14a is projected onto the reflection boundary plane 12m, then the reflected light on the reflection plane 12m is received into the light receiving means 16, and its output is processed in the control means 30, and it can be rapidly determined whether the liquid 2a having the low surface tension is leaking or not in the sensor 20a.

Further, the liquid leakage sensor 20a shown in FIGS. 2B and 5 is a kind of leakage sensor including at least two reflection boundary planes 12m, 12n contactable with a leaking liquid through gas layers d6, d7 or a permeable layer (For example, in FIG. 5, the liquid permeable layer is a part of the thin paper 8 held between the bottom surface 99 of the vessel 98 and the underside 12p of the case.) to said leaking liquid, at least one light source 14a, light receiving means 16 and control means 30 connected to these means, and further, said included members are placed at the same direction to each reflection boundary plane respectively, wherein a light 22u emitted from the light source 14a is projected onto the first total reflection boundary plane 12m, and the reflected light 22v on the total reflection plane 12m is projected onto the second total reflection boundary plane 12n, and further the reflected light 24u on the second total reflection plane 12n is received into the light receiving means 16, and its output is processed in the control means 30, and it can be determined whether the liquid is leaking or not in the sensor 20a. As for the liquid sucking means, the gas layer d6, d7 or a partial or the whole plane of the liquid permeable layer opposed to the bottom surface 99 is directly opened toward the bottom surface 99, or the bottom surface 99 is formed as one portion of the gas layer or the liquid permeable layer. Further, in the liquid leakage sensor 20a, at least one high-speed liquid sucking means 6 can be provided for directly and rapidly sucking the leaking liquid 2a having a low surface tension of $6 \times 10^{-2}$ N/m or less at 20° C. from the bottom surface 99 to the reflection boundary plane 12m against gravity based on the capillary action introduced through a given clearance d0 and a specified sectional shape of the air gap even with a small amount of liquid 2a.

As for the given clearance d0 of the air gap portion enabling to provide the capillary phenomenon described above, it is preferable to set the clearance d0 to a distance equal to or smaller than the thickness d1 (d0<d1) of the liquid 2a having the low surface tension and dripping over the bottom surface 99 of the liquid storing vessel 98 as shown in FIG. 1C, in order to stably produce the capillary phenomenon with a small amount of liquid 2a. As for a specified sectional shape of the air gap portion enabling to stably produce the capillary phenomenon, it can be to used, for example, a parallel plane section having the air gap distance d0 or less, and/or a wedge-shaped section having a gradually narrowed air gap upwardly and a maximum gap distance d0 or less, etc. Further, any shape can be used as the sectional shape enabling to stably produce the capillary phenomenon.

<Embodiment 2>

FIGS. 7 to 9 related to FIGS. 1 to 6 illustrate another embodiment of liquid leakage detecting systems 1b and 1c according to the present invention where the leakage detecting portion (liquid leakage sensor portion) is divided separately into a liquid leakage sensor head 20b and a warning means 70b including a sound producing means. While like components are denoted by like numerals as those of the previous embodiment, in the liquid leakage detecting system 1b of FIG. 7, the liquid leakage sensor 20b and the warning means 70b placed some distance apart constitute an explosion-proof type system 1b for detecting a leakage wherein signals are communicated through wireless means, and in the liquid leakage detecting system 1c, the liquid leakage sensor 20b and the warning means 70b placed some distance apart constitute an explosion-proof type system 1c for detecting a leakage wherein signals are communicated through wired means.

Further, in the explosion-proof leakage detecting system shown in FIG. 8, the leakage sensor 20b (liquid leakage detecting head) can be placed on a danger zone, and a control portion 39 can be placed on a safety zone separated physically from the danger zone and consisting of an electric circuit. As for the high-speed liquid sucking means 6b, all the components of the sucking means are constituted only from the members consisting of the case 12. And a complete explosion-proof structure is provided for the leakage detecting head 20b with components having no electric wiring in order to be absolutely free from inviting an accident based on an electric firing/an electric igniting. Further, no holder 5 is needed for installation of the sensor case and all the members are integrated into the single case so as to be enabled to operate the sensor for itself independently. In the explosion-proof type sensor system, a light source 14 can be isolated in control portion 39 placed on a safety zone remotely separated from the danger zone, and a first optical system for detecting a leakage is formed through a following optical path, that is, a projecting light 22x emitted from the light source 14 is guided through an light transmitting means 40a such as an optical-fiber to the detecting head 20b, then projected onto reflection boundary plane 12m and 12n successively, and reflected light 24u is received and guided through an light transmitting means 42a to light receiving means 16 (14-40a-12m-12n-42a-16). Then, a second optical system for detecting a mal-installation of the case is formed through a following optical path, that is, a projecting light 22z emitted from the light source 14 is guided through an light transmitting means 40c to the detecting head 20b, then projected onto the mounting plane 5j (in this example, as any thin papers 8 are not used, plane 5j is preferably formed with a light reflective material such as a white surface or a reflective surface.) formed on the top surface of high-speed sucking means 6b described later, and reflected light 24z is received and guided through an light transmitting means 42c to light receiving means 16c (optical path of mal-installation detecting means 4b: 14-40c-5j-42c-16c). Therefore, in the system 1b or 1c, the detection of liquid leakage can be very safely done even when liquid 2/2a are volatile liquid and there is a danger of an ignition or an explosion.

Namely, in the first optical system described above, a part of the emitting light from the light source 14 placed on the remote location is guided through light transmitting means 40a into the case 12, then projected as light 22u onto the reflection boundary plane 12m of the case bottom portion with a specified angle equal to or greater than a critical angle for providing the total reflection, and its totally reflected light 22v is further totally reflected on the reflection boundary plane 12n, furthermore its totally reflected light 24u is received into the end of light transmitting means 42a, then guided through light transmitting means 42a into the light receiving means 16 in the control portion 39 placed on the safety zone, and finally the reflected light 24u is inputted through a multiplexer 31, an AD converting means 32 and a double buffer 34 in the control means 30 doubly used as the leakage detecting means 18.

Further, in the second optical system described above, another part of the emitting light from the light source 14 placed on the remote location is guided through light transmitting means 40c into the case 12, then projected as light 22z onto the reflective material 5j with a specified angle less or more than a critical angle. Its reflected light 24z is received at the end of light transmitting means 42c and guided through it into the light receiving means 16c placed on the remote location. The reflected light 24z is then inputted through a multiplexer 31, an AD converting means 32 and a double buffer 34 in the control means 30 doubly used as the leakage detecting means. Further, the bottom portion of the case 12 is preferably made from a light transmissive member 12d consisting of a transparent or translucent material as a base material, and its outside member is preferably covered or made from a shading material such as a synthetic resin having a shading characteristics, etc. except for light emitting area, light reflecting area and light receiving area, and further preferably formed integrally with the light transmissive member 12d. According to the shading member described above, any effects from external noise light around the case can be easily cut down greatly without holder 5, and even when the floor surface as a leakage sensing surface is made from a white color surface or a mirror finished surface, a kind of optical structure preventing from receiving unnecessary reflected lights from the floor can be provided with the shading member at an early stage of a liquid leaking.

In the control portion 39, the amount of reflected light from the leakage sensing surface is continuously checked by the light receiving means 16 and 16c, and in the example of FIG. 8, when less than the specified amount of reflected light is detected, it is determined that the leakage error is detected or a mal-installation of the sensor is occurred. Thus, after detecting error described above, error signals are issued through the wire 26 to the external control port similar to the conventional means. Further, the error detecting signal is transmitted through a wireless communicating means 37 including a wireless LAN to the wireless receiving means 79c in the warning means 70b described later.

And in the liquid leakage sensor 20b, the case 12 is independently functioning as a liquid leakage sensor without holder 5, it is preferable to prevent the case 12 from overturning through the presser bar arm 60 extended from a side wall of a building or an equipment to the upper lid of the case wherein one end portion 62 of the presser 60 can be fixed to the building 61 by a fixing member 64, and the other end portion 66 can be pressured on the upper portion of the case 12.

Further, in the example of FIG. 8, the high-speed sucking means 6b is made from the members consisting only of the case 12. As for the structure of the sucking means 6b, for example, in a space between the bottom portion 12d of the case and the bottom surface 99, a rectangular parallelepiped protruding portion 12u having a leading edge-like wedge 12v is integrally formed and foldably fitted with the bottom portion 12d toward the case center. The protruding portion 12u is preferably made from a light absorber/a light-transmitting material of the projected light for detecting a leakage, and a bottom face 12w of the protruding portion 12u can be held in non-contactable with the bottom surface 99, and form an air gap portion d6 parallel to the surface 99 with a given clearance d6=1 mm or less (preferably 0.9 mm or less, more preferably 0.5 mm or less). Based on capillary action through the air gap d6, the leaking liquid 2a having a low surface tension of $6 \times 10^{-2}$ N/m or less at 20° C. can be very rapidly diffused along the bottom face 12w opposite to the bottom surface 99. Further, at the wedge 12v of the protruding portion 12u located at one end of the bottom face 12w, an air gap portion d7 parallel to the total reflection plane 12m with a given clearance d7=1 mm or less (preferably, 0.9 mm or less, more preferably, 0.5 mm or less) is formed between the wedge 12v and the total reflection plane 12m of the case 12, and/or a wedge-like air gap portion d7 gradually narrowed upwardly with a maximum clearance d7=1 mm or less (preferably, 0.9 mm or less, more preferably, 0.5 mm or less) at the lowermost end is formed between the wedge 12v and the total reflection plane 12m of the case 12. Based on capillary action through the wedge-like air gap d7, the leaking liquid 2a having a low surface tension of $6 \times 10^{-2}$ N/m or less at 20° C. can be very rapidly sucked up from the bottom surface 99 over a specified detecting spot on the reflection boundary plane 12m against the gravity even with a small amount of the liquid.

A conventional thermoplastic resin and thermoplastic elastomer can be used as a synthetic resin for integral molding of the case. For example, polyethylene terephthalate, amorphous polyethylene terephthalate, polyethylene, polystyrene, polypropylene, etc. can be used as the thermoplastic resin. Further, polybutadiene resin can be used as the thermoplastic elastomer for integral molding.

Specifically, in the bottom portion of the case, the main body 12d is integrally formed with the high-speed sucking means 6b through a connecting hinge wherein the main body 12d is connected with the high-speed sucking means 6b through a V-shaped groove at an outer periphery edge, and they are integrally formed with the synthetic resin, i.e., the thermoplastic resin or the thermoplastic elastomer. In case of folding the high-speed sucking means 6b under the total reflection plane 12m at the V-shaped groove, the air gap portion d7 is formed through plural small protrusions having a given height d7 formed on the edge of the plane 12v, and after folding the high-speed sucking means 6b under the bottom portion 12d, the air gap portion d6 is formed between the bottom portion 12d and the liquid sensing bottom surface 99 through plural small protrusions having a given height d6 formed on the plane 12w, and a closing or opening mechanism is formed at the groove for producing a repulsive force. Therefore, when the high-speed sucking means 6b is folded under the main body 12d of the case toward the total reflection plane 12m, and fitted approximately in a horizontal state to the installation floor of the case 12, the air gap d7 can be maintained between the main body 12d and the high-speed sucking means 6b based on own weight or the presser means 60 from its outside, and formed a part of the optical path for the optical-type mal-installation detecting means 4b. Consequently, when the case 12 is installed at the horizontal bottom surface 99, the bottom face of the case 12 is set up in a horizontal state or parallel to a horizontal plane defined by a level.

Moreover, an embodiment of the explosion-proof type warning means 70b separately installed from the main body of the sensor will be explained with reference to FIG. 9. Specified electric power is supplied from an electric power source 79a separately placed on a safety zone (non-danger zone) together with the control portion 39 through a Zener barrier 78a to the warning means 70b placed on a danger zone. Further, an output from a setting means of an identification number 79d (e.g. consisting of a dip-switch, etc.) for discriminating and identifying said warning means 70b from other warning means separately installed at the outside of the specified area is inputted to a control portion 79b, and a wireless signal receiving means 79c is installed in the control portion 79b and receives an error detecting signal issued from the wireless communication means 37 when the liquid leakage is detected or it is determined that the mal-installation of the sensor is occurred in the control portion 39. When the electric power from the Zener barrier 78a is supplied through a switch means 79e to an output driving means 79h, a warning lamp 79k such as a rotating-light consisting of a red LED, etc. can be turned on and activated, and alarming sounds for detecting error can be emitted from the sound producing means 72 through the resonator 75 into the air.

In the configuration described above where the sensor head 20b is installed separately from the warning means 70b including the sound producing means 72, and communicating each other with wireless means, it is preferable for the warning means 70b to install at an upper space formed through extending the liquid storing vessel 98 upwardly in the liquid leakage detecting system 1b, and providing for said sensor head with an easy visibility uniquely identified among other sensor heads placed outside from a specified distance (e.g., within 2 m, more preferably, within 1.5 m, furthermore preferably, within 1 m). According to the explosion-proof structure shown in the warning means 70b, the detection of leaking liquids having volatile or inflammable characteristics can be done very safely and reliably, and there are advantages in that adjusting works of the system or maintaining or monitoring works can be easily done by everybody without undergoing any special trainings.

Based on these structures described above, its operation of the liquid leakage detecting system 1b, 1c will be explained. The structure of the high-speed sucking means 6b of FIG. 8 is almost similar to that of the sucking means 6 of FIG. 5 except that no thin paper 8 is used and light transmitting means for projecting-light and received-light is added into a part of the optical path in the structure of the high-speed sucking means 6b. Accordingly, operations between the system 1a and 1b or 1c are basically similar to each other.

Specifically, at first, in the optical-type mal-installation detecting means 4b, the light 22z from the light source 14 through the light transmitting means 40c is projected onto the reflective material 5j buried on the upper surface of the high-speed sucking means 6b at an incident angle less than a critical angle, and its reflected light 24z is received through the light transmitting means 42c into the light receiving means 16c, then converted into an electric signal and inputted into the control means 30. The reflective surface made from a white color or a mirror finished surface on the reflective material 5j can be placed on the upper surface of the projecting portion 12u. The reflective surface of the projected light 22z can be formed on the projecting portion 12u through an adhesion, melting, press-fitting, or processing a reflective surface having plural small concavities and convexities on the upper surface of the projecting portion 12u.

On the other hand, when the air gap portion having the specified distance d7 is not formed between the main body 12d and the projecting portion 12u, a kind of mal-installation states can be invited, therefore the sensor head 12d can be floated, tilted obliquely, or overturned based on repulsive force sprung from the hinge mechanism described above, and the gap distance between the sensor head 12d and the projecting portion 12u can be kept more than the specified distance d7 based on the built-in opening and closing mechanism in the sensor head 12. Consequently, in the mal-installation conditions, the normal second optical path cannot be formed and the projected light can be diffused into a gas layer of the air, thus, the optical path between the projected light 22z and the reflected light 24z cannot be formed at the normal position in the mal-installation detecting means 4b. Therefore, the mal-installation state of the sensor head 12 can be easily detected, and in the control portion 39 placed on the non-danger zone, a mal-installation alarm signal (or an error code ER-A) can be digitally issued externally through the cable 26 based on the control means 30 consisting of the MPU, etc., and the liquid leakage sensor 20b can be kept in an error stand-by condition.

At this time, a mal-installation detecting signal based on the mal-installation detecting means 4b is further emitted from the wireless communicating means 37 in the control portion 39 placed on the non-danger zone. After this wireless error signal can be received at the receiving means 79c in the warning means 70b placed on the danger zone, the electric power can be supplied from the Zener barrier 78a through the switch means 79e to the output driving means 79h in the control portion 79b, and a warning lamp 79k of a rotating lamp unit is turned on and activated, further, a warning sound for detecting error is emitted externally from the sound producing means 72 through the resonator 75. In case of sharing the warning means 70b among plural leakage sensors 20b, or being placed on closely plural warning means 70b each other, the identification number for specifying each warning means can be preferably added into the wireless error signal emitted from the communicating means 37 in order to discriminate each warning means 70b respectively. The added identification number can be automatically extracted in the control portion 79b, and it is determined whether the said warning means 70b is selected or not through comparing the received identification number with the one outputted from the setting means 79d. After said warning means 70b is specified by the received identification number, the sound producing means 72 is activated through the output driving means 79h in said warning means 70b, and the vibrations are amplified and emitted through the resonator 75 into the air. Therefore, the operator warned with the mal-installation alarm signal through cable 26 can rapidly find out where is the mal-installation activated sensor is placed and very easily distinguish and uniquely identify the mal-installation activated sensor from the other sensors through approaching closely to the warning device emitting presently with the audio alarming sounds without searching for or checking each floor surface or each bottom surface of the liquid storing vessel respectively such as a conventional operation.

In a normal installation condition without any mal-installation warning signals described above, the liquid leakage sensor 20b is normally activated. In case of no leaking liquids, the optical path from the projected light 22z to the reflected light 24z in the optical mal-installation detecting means 4b is formed at the normal optical position, and the projecting light 22z from the light source 14 through the light transmitting means 40c is reflected from the reflective plane 5j on the protruding portion 12u. Then, its reflected light 24z is received and transmitted through the light transmitting means 42c into the light receiving means 16c, and its output is compared with the normal level of the received light in the detecting means 18. Therefore, the normal installation conditions of the liquid leakage sensor 20b can be easily detected.

Further, in the optical system for detecting liquid leakage, the projecting light 22u from the light source 14 through the light transmitting means 40a is incident onto the first total reflection plane 12m at a specified angle of incidence according to the refractive index of the transparent or translucent material 12d so as to totally reflect the projecting light 22u from upward to sideways on the total reflection plane 12m at the specified critical angle of incidence or more. The totally reflected light 22v is projected onto the second total reflection plane 12n. The totally reflected light 24u on the total reflection plane 12n is received at one end of the light transmitting means 42a at a specified angle according to the refractive index of the transparent or translucent material 12d, then transmitted through the light transmitting means 42a into the light receiving means 16. The liquid leakage detecting light propagating through such an optical path is converted into an electric signal through a photoelectric converting element 16, and its output is processed in the control means 30 doubly used as the detecting means 18, for example digitally. Or, an analog output of the light receiving means 16 is directly inputted to an analog processing means consisting of an analog comparator, etc., and is analogically processed in the control means 30 doubly used as the detecting means 18 composed of analog circuits. In addition, when no leaking liquids exist, a normal amount of the receiving light is observed at the light receiving means described above, and no decreasing phenomenon of the amount of receiving light is observed.

Next, when the liquid 2a having a low surface tension of $6 \times 10^{-2}$ N/m or less at 20° C. is diffused over the liquid detecting bottom surface 99 in a form of a thin film layer, the leaking liquid 2a having a liquid level d1 is diffusing over until the liquid is reaching to the area of the bottom surface 99 opposed to the bottom face 12w of the rectangular protrusion solid 12u forming one portion of the high-speed liquid sucking means 6b. At a time when the liquid 2a is spilt over the bottom surface corresponding to the high-speed sucking means 6b, the leaking liquid 2a is rapidly sucked into the parallel air gap portion d6 based on the capillary phenomenon (2a1 of FIG. 5), and is in contact with the bottom face 12w through the air gap d6 formed between the bottom surface 99 and the bottom face 12w. It is preferable to set up the distance d6 of the air gap nearly equal to or less than the level d1 of the liquid 2a. As a result, the leaking liquid 2a is diffused at high speed along the entire bottom face 12w corresponding to the liquid detecting bottom surface 99.

Thereafter, when the liquid 2a is diffusing along the bottom face 12w of the projecting portion 12u to the lowermost end of the edge portion 12v (2a2 of FIG. 5), the leaking liquid 2a is arriving at one end of the parallel air gap portion d7 formed between the total reflection plane 12m of the case 12 and the edge portion 12v. The air gap portion d7 is set up so as to provide the capillary action of the liquid 2a with a given distance d7. Accordingly, even with a small amount of the liquid 2a, the liquid 2a is directly sucked up and spilt rapidly across a specified leakage detecting spot upwardly on the reflection boundary plane 12m from the bottom surface 99 against gravity (2a3 of FIG. 5). Therefore, when the liquid 2a is passing upwardly at the specified leakage sensing spot on the reflection plane 12m, most of the projected light 22u from the light source 14 is not totally reflected on the total reflection plane 12m, and approximately refracting straightly through the bottom portion 12d and the total reflection plane 12m, and further, refracting into the liquid 2a filled in the air gap d7. Furthermore, most of the light 22u is propagating through the rectangular protrusion solid 12u formed with a light-absorbing/a light-transmissive material, and then through the liquid 2a filled into the air gap d6 to the bottom surface 99. At the bottom surface 99, the light is reflected and propagating in the opposite direction to the total reflection plane 12n. Therefore, the amount of a passing light 24u totally reflected on the total reflection plane 12m and then totally reflected on the total reflection plane 12n, and further received into an end of the light transmitting means 42a, guided through the light transmitting means 42a to the light receiving means 16 is greatly decreased. So that the output of light receiving means 16 is processed in the control means 30 and the leaking liquid 2a can be very rapidly detected at a very early stage with a small amount of the leaking liquid 2a diffusing thinly over the bottom surface 99.

On the other hand, when a large amount of liquid 2a having low surface tension starts to overflow on the bottom surface 99 at a time, the periphery of the sensor head 20b is entirely submerged into the liquid 2a, and the specified sensing spot of the leaking liquid on the reflection boundary plane 12n is also submerged into the liquid 2a. Therefore, the projected light 22u from the light source 14 is totally reflected on the total reflection plane 12m, then the totally reflected light 22v is projected on the total reflection plane 12n. But according to the liquid 2a, the totally reflected light 22v is not totally reflected on the total reflection plane 12n, and immediately refracted through the total reflection plane 12n, further, straightly refracted through the liquid 2a filled in the air gap portion d4, and reflected on the bottom surface 99, so that propagated or progressed toward the direction having nothing to do with the receiving area of the light transmitting means 42a. As a result, the amount of light 24u, which is forming a part of the optical path for detecting the leaking liquid and totally reflected on the totally reflection plane 12n and incident into the end of the light transmitting means 42a, is greatly decreased. Thereafter, the output of light receiving means 16 is processed in the control means 30 and the large amount of leaking liquid 2a can be very rapidly detected at a very early leaking stage. After the leaking liquid 2a and/or 2 is detected in the control means 30 doubly used as the liquid leakage detecting means 18, a detecting signal of a leakage is externally issued in a digital output through the pair of cables (leakage detecting error code ER-B).

At this time, a liquid leakage detecting signal based on the leakage detecting means 18/30 is further emitted from the wireless communicating means 37 in the control portion 39 placed on the non-danger zone. After this wireless error signal is received at the receiving means 79c in the warning means 70b placed on the danger zone, the electric power is supplied from the Zener barrier 78a through the switch means 79e to the output driving means 79h in the control portion 79b, and a warning lamp 79k attached to the rotating lamp unit is turned on and activated, further, warning sounds for detecting leakage-error is emitted externally from the sound producing means 72 through the resonator 75 into the air. In case of sharing the warning means 70b among plural leakage sensors 20b, or being placed on closely plural warning means 70b each other, the identification number for specifying each warning means can be preferably added into the wireless error signal emitted from the communicating means 37 in order to distinguish each warning means 70b respectively. The added identification number can be automatically extracted in the control portion 79b, and it is determined whether the said warning means 70b is selected or not through comparing the received identification number with the one issued from the setting means 79d.

After said warning means 70b is selected by the received identification number, the sound producing means 72 is activated through the output driving means 79h in said warning means 70b, and the vibrations are amplified and emitted through the resonator 75 into the air. Therefore, the operator warned with the leakage-error detecting signal through the cable 26 can rapidly find out where is the leakage-error activated sensor is placed on and very easily distinguish and uniquely identify the leakage activated sensor from the non-activated sensors through approaching closely to the warning means emitting presently audio warning sounds amplified through the resonator without searching for or checking each floor surface or each bottom surface of the liquid storing vessel respectively such as a conventional operation.

Next, when a liquid 2 having a surface tension of $6 \times 10^{-2}$ N/m or more at 20° C. (shown in FIG. 6D) is diffused over the bottom surface 99, in the example of FIG. 8, the liquid 2 having a liquid level d3 has been diffused through the air gap portion d4 formed between the case bottom portion 12d and the bottom surface 99 toward the total reflection plane 12n without the thin paper 8. Thus, when the leaking liquid 2 reaches at a specified spot for detecting a leakage on the reflection boundary plane 12n, the projected light 22u from the light source 14 through the light transmitting means 40a is totally reflected on the total reflection plane 12m, and the totally reflected light 22v on the plane 12m cannot be totally reflected on the total reflection plane 12n affected by the liquid 2, and further straightly refracted through the total reflection plane 12n. Furthermore, the totally reflected light 22v is refracted and straightly passing through the liquid 2, and finally reflected on the bottom surface 99. Consequently, the light 22v is propagating and advancing into the direction having no relations to the light receiving area at the end of the light transmitting means 42a. Therefore, the amount of a passing light 24u totally reflected on the total reflection plane 12n, and incident into the end of the light transmitting means 42a, while forming the optical path for sensing a liquid leakage, is greatly decreased. And the amount of transmitted light through the light transmitting means 42a to the light receiving means 16 is processed in the control means 30 and the leaking liquid 2 can be very rapidly detected at a very early leaking stage with a small amount of the liquid diffusing thinly over the bottom surface 99.

When a large amount of liquid 2 starts to overflow at a time, the periphery of the head 20b is entirely submerged into the liquid 2, and the specified sensing spot for the early leaking liquid on the reflection boundary plane 12n is also submerged into the liquid 2. Therefore, the projected light 22u from the light source 14 through the light transmitting means 40a is totally reflected on the total reflection plane 12m, then the totally reflected light 22v on the plane 12m is projected on the total reflection plane 12n. Further, according to the liquid 2, the totally reflected light 22v is not totally reflected on the plane 12n, and immediately refracted through the total reflection plane 12n, furthermore, straightly refracted through the liquid 2 filled in the air gap portion d4, then reflected on the bottom surface 99, and finally propagated or advanced into the directions having nothing to do with the installation position of the light receiving end of the light transmitting means 42a. As a result, in case of overflowing the large amount of liquid 2, the amount of light 24u, which is forming a part of the optical path for detecting the leaking liquid and totally reflected on the totally reflection plane 12n and incident into the light receiving end of the light transmitting means 42a, is greatly decreased in comparison with no leaking liquid 2. Thereafter, the output of light receiving means 16 transmitted through the light transmitting means 42a is processed in the control means 30 and the large amount of leaking liquid 2 can be very rapidly detected at a very early leaking stage.

After the leaking liquid 2a or 2 is detected in the control means 30 doubly used as the liquid leakage detecting means 18, a detecting signal of a leakage is externally issued in a digital output through the pair of cables 26 (leakage detecting error code ER-B) in order to alarm the maintenance operator. Moreover, in the light receiving process described above, the sensitivity of the light receiving means (or element) 16, 16c can be improved by widely collecting the reflected light through a light converging means such as a lens, or a concave mirror, etc.

At this time, a liquid leakage detecting signal based on the leakage detecting means 18/30 is further radiated from the wireless communicating means 37 in the control portion 39 placed on the non-danger zone. After this wireless error signal is received at the receiving means 79c in the warning means 70b placed on the danger zone, the electric power is supplied from the Zener barrier 78a through the switch means 79e to the output driving means 79h in the control portion 79b, and the warning lamp 79k attached to the rotating lamp unit is turned on and activated, further, warning sounds for detecting error are emitted externally in the audio frequency from the sound producing means 72 through the resonator 75 into the air. After said warning means 70b is selected by the received identification number, the sound producing means 72 is activated through the output driving means 79h in said warning means 70b, and the vibrations are amplified and emitted through the resonator 75 into the air. Therefore, the operator warned with the leakage-error detecting signal through the cable 26 can rapidly go to the warning-activated area, and find out where is the leakage-error activated sensor is placed on and very easily discriminate and uniquely identify the leakage activated sensor from the other non-activated sensors through approaching closely to the sound warning device without searching for or checking each floor surface or each bottom surface of the liquid storing vessel respectively such as a conventional operation.

Therefore, according to the liquid leakage sensor 20b as shown in FIG. 8, after installing the leakage sensor 20b on the bottom surface 99 without the holder 4, 5, or the thin paper 8 and eliminating the external noisy light, there is an advantage of enabling to rapidly detect a small amount of the liquid diffusing over the bottom surface 99 at the early leaking stage before the liquid 2a or 2 is reaching above the upper surface of the holder 4. Moreover, no electric signals are flowed through the liquid leakage detecting head at all, the detection processing can be very safely done even for a volatile liquid. When a large amount of the liquid is overflowed at a time, the liquid can be checked doubly or triply and detected its leakage, therefore the reliability of the liquid leakage detection processing can be further improved. Further, based on changing the length of the light transmitting means 40/42, the physical distance between the light source 14, the light receiving means 16, 16c and the total reflection plane 12m/12n can be changed into a desired length.

Further, in a state wherein the distance between the main body 12d of the case and the projecting portion 12u cannot be held in a specified distance d6 or d7, the optical path for the optical-type mal-installation detecting means 4b cannot be formed in a predetermined position. Based on repulsive force sprung from the hinge mechanism, the sensor head 12d can be floated, tilted obliquely, or overturned, and the mal-installation conditions are invited through the built-in opening and closing mechanism between the sensor head 12 and the projecting portion 12u. Therefore, the optical path from the projected light to the reflected light can be bent drastically, and the mal-installation state of the sensor head 12 can be easily detected, further, in the control portion, the liquid leakage error and the mal-installation error can be distinguished easily, and transmitted or treated adequately.

By the way, the thin paper 8 can be also used in the liquid leakage sensor 20b of FIG. 8 similarly as in FIG. 5.

In the embodiments described above, the leakage detection of a resist liquid supplied to the resist liquid coating mechanism 81a and the leakage detection of a temperature adjusting liquid for the resist liquid are explained. Further, the present invention can be similarly applied to the leakage detection of a developer supplied to the developing mechanism 81b and the leakage detection of a temperature adjusting liquid for the developer as explained above. Moreover, the present invention can be also applied to the etching processing, the washing processing, etc. Furthermore, the present invention can be also applied to the detection of a liquid leaking from each temporarily stored tanks for respective processings described above. As for the causes of the above leakage, for example, there are damage to each tank, overflow due to breakdown of a supply system, leakage from a piping portion, etc., and overflow due to breakdown of a discharge system, etc.

In the embodiments described above, the present invention is applied to the coating and developing equipment of the semiconductor wafer, however, the present invention is not limited to these equipments, and the present invention can also be applied to other equipments of the semiconductor wafer, or equipments of an LCD substrate, a glass substrate or a CD/DVD substrate, etc. According to the liquid leakage detecting system of the present invention, a leakage of processing liquid or a leakage of temperature adjusting liquid can be detected accurately and safely, and a peripheral portion of the piping can be prevented from a pollution, corrosion, etc. due to the leaking liquid. Further, the present invention can provide a maintenance operator with an intuitively understandable system wherein after detecting a leaking liquid, he can easily find out where is the error-activated sensor is placed on through approaching closely to the warning sounds emitted from resonator into the air in the audio frequency. Therefore, the maintenance can be done easily, and the efficiency of processing equipments can be improved.

The high-speed liquid sucking means described above can also be composed from the members only consisting of the holder. Further, as like the explosion-proof type liquid leakage sensor shown in FIG. 7, a non-explosion-proof type sensor head can also be connected to the isolated warning means with the wireless communicating means mutually.

What is claimed is:

1. A liquid leakage detecting system including at least one liquid leakage sensor having at least one detecting portion contactable with a leaking liquid through an air layer or a liquid permeable layer and comprising:
    warning means including a sound producing means; and
    said warning means is placed within a specified spatial distance from each installation position of said liquid leakage sensor, wherein after detecting any abnormal conditions of said liquid leakage sensor, a warning signal is issued at least in an audio frequency based on said warning means in order to discriminate said condition-activated leakage sensor from other non-activated leakage sensors placed outside of said specified spatial distance and uniquely identify said installation position of said activated leakage sensor.

2. The liquid leakage detecting system according to claim 1, wherein said specified spatial distance includes at least one of an internal space of a storing vessel for said leaking liquid, and an upper space of a storing vessel for said leaking liquid.

3. The liquid leakage detecting system according to claim 1, wherein said liquid leakage sensor and said warning means are connected through signal lines, and/or connected each other with wireless communicating means, and/or integrally formed.

4. The liquid leakage detecting system according to claim 1, wherein said liquid leakage detecting portion is consisting of an optical-type liquid leakage detecting portion including at least one optical type reflection boundary plane, and/or consisting of an optical-type liquid leakage detecting portion including at least one optical type transmitting boundary plane, and/or consisting of an electrically conductive type liquid leakage detecting portion including a pair of electrodes changed in impedance between said electrodes in accordance with a non-insulating liquid.

5. The liquid leakage detecting system according to claim 1, wherein said sound producing means includes means for producing a sound based on striking a resonating body, and/or a whistle or a siren, and/or means for producing a sound based on a vibration, and/or means for producing a sound based on a vibration and a resonator connected to it.

6. The liquid leakage detecting system according to claim 1, wherein the warning sound emitted from said sound producing means in a form of audio frequency includes an intermittent and/or continuous sound of a constant or variable frequency, an intermittent and/or continuous sound of a constant or variable tone color, an intermittent and/or continuous sound of a constant or variable sound intensity, an intermittent and/or continuous sound of a constant or variable sound pitch, and an intermittent and/or continuous sound of a constant or variable duty ratio, or combinations thereof.

7. The liquid leakage detecting system according to claim 1, wherein said warning means further includes a warning lamp.

8. The liquid leakage detecting system according to claim 7, wherein said warning means changes the intensity of said warning lamp corresponding to changes in the warning sound emitted from said sound producing means in an audio frequency.

9. The liquid leakage detecting system according to claim 1, wherein, after detecting any abnormal conditions of said liquid leakage sensor, different warning sounds having an audio frequency can be emitted from said sound producing means in order to discriminate a leakage detection from a mal-installation detection.

10. The liquid leakage detecting system according to claim 1, wherein said warning means includes number setting means for identifying said warning means for itself.

11. The liquid leakage detecting system according to claim 1, wherein said liquid leakage sensor is consisting of an explosion-proof type structure.

12. The liquid leakage detecting system according to claim 1, wherein said warning means is consisting of an explosion-proof type structure and an electric power is supplied through a Zener barrier.

13. The liquid leakage detecting system according to claim 1, wherein said warning means can be remotely controlled by the external commands in order to turn-on, turn-off, reset, or restart of emitting said warning sounds.

14. The liquid leakage detecting system according to claim 1, wherein said liquid leakage sensor further has high-speed liquid sucking means enabled to suck a small amount of liquid having a low surface tension of $6\times10^{-2}$ N/m or less at 20° C. at high-speed.

15. A liquid leakage sensor having at least one light-reflecting plane contactable with a leaking liquid through a gas layer or a permeable layer to said leaking liquid, a light source, a photo-detection means, and a control means connected with said light source and photo-detection means, and
- further including an integrally formed case containing said light source and said photo-detection means and consisting of a transparent or translucent member at a bottom portion, or
- further including a case and a case holder mounted at the bottom edge portion of said case in order to prevent unnecessary reflecting light from a floor surface based on floor characteristics or a color, and overturning,
- wherein further comprising;
- detecting means of abnormal conditions concerning with said sensor;
- warning means including a sound producing means; and
- after detecting any abnormal conditions of said sensor, a warning signal about said abnormal conditions is issued at least in a form of an audio frequency sound produced by said sound producing means.

16. The liquid leakage sensor according to claim 15, wherein said control means is doubly used as said decting means of abnormal conditions, or
- in said detecting means of abnormal conditions, the determination whether a liquid leakage is detected or not and/or whether a mal-installation of said sensor is detected or not can be done.

17. The liquid leakage sensor according to claim 16, wherein after detecting any abnormal conditions of said liquid leakage sensor, different warning sounds having an audio frequency can be emitted from said sound producing means in order to discriminate a leakage detection from a mal-installation detection.

18. The liquid leakage sensor according to claim 15, wherein said sound producing means includes means for producing a sound based on striking a resonating body, and/or a whistle or a siren, and/or means for producing a sound based on a vibration, and/or means for producing a sound based on a vibration and a resonator connected to it.

19. The liquid leakage sensor according to claim 15, wherein said sound producing means is formed in said case, or
- said sound producing means is formed in said case holder, or
- said sound producing means is split and formed into two parts between said case and said case holder.

20. The liquid leakage sensor according to claim 15, wherein said sound producing means is formed in said case, or
- said sound producing means is formed in said case holder, or
- said sound producing means is split and formed into two parts between said case and said case holder, and said case can be detachable to and from said case holder through one-touch operation.

21. The liquid leakage sensor according to claim 15, wherein the warning sound emitted from said sound producing means in a form of audio frequency includes an intermittent and/or continuous sound of a constant or variable frequency, an intermittent and/or continuous sound of a constant or variable tone color, an intermittent and/or continuous sound of a constant or variable sound intensity, an intermittent and/or continuous sound of a constant or variable sound pitch, and an intermittent and/or continuous sound of a constant or variable duty ratio, or combinations thereof.

22. The liquid leakage sensor according to claim 15, wherein said warning means further includes a warning lamp.

23. The liquid leakage sensor according to claim 22, wherein said warning means changes the intensity of said warning lamp corresponding to changes in the warning sound emitted from said sound producing means in an audio frequency.

24. The liquid leakage sensor according to claim 15, wherein said warning means includes number setting means for identifying said warning means for itself.

25. The liquid leakage sensor according to claim 15, wherein said liquid leakage sensor is consisting of an explosion-proof type structure.

26. The liquid leakage sensor according to claim 15, wherein said warning means can be remotely controlled by the external commands in order to turn-on, turn-off, reset, or restart of emitting said warning sounds.

27. The liquid leakage sensor according to claim 15, wherein said case is consisting of a main body portion and a cover portion, and further
- said sound producing means is integrally formed into said cover portion.

28. The liquid leakage sensor according to claim 15, wherein said reflection boundary plane is consisting of said case bottom portion and/or the upper surface of said case holder.

29. The liquid leakage sensor according to claim 15, wherein thin paper changed into transparent through the permeation of the leaking liquid is closely attached to at least one of said reflection boundary plane.

30. The liquid leakage sensor according to claim 15, wherein an air gap portion is formed in said gas layer or said permeable layer without thin paper used as consumables and changed into transparent through the permeation of the leaking liquid.

31. The liquid leakage sensor according to claim 15, wherein the output of said light receiving means is processed based on the amount of the reflected light and determined whether said leaking liquid is detected or not, or whether a mal-installation condition of said sensor is detected or not, and/or
- said light receiving means is consisting of plural light receiving elements having each different light receiving angle, and outputs of said plural light receiving elements arranged at such a position so as to be discriminated respective light receiving position of said reflected light from each other are converted into electric signals, and processed a series of light and dark reflected light pattern at a predetermined period in order to determined whether said leaking liquid is detected or not, or whether a mal-installation condition of said sensor is detected or not.

32. A liquid leakage sensor including at least two reflection boundary planes contactable with a leaking liquid through a gas layer or a permeable layer to said leaking liquid, at least one light source, light receiving means and control means connected to said light source and light receiving means, and further, said included members are placed at the same direction to each said reflection boundary plane respectively,
- wherein a light emitted from said light source is projected onto the first total reflection boundary plane, and the reflected light on said first total reflection plane is projected onto the second total reflection boundary plane, and further the reflected light on said second total reflection plane is received into said light receiving means, and its output is processed in said control means, and further including an integrally formed case containing said light source and said light receiving means and consisting of a transparent or translucent member at a bottom portion, or further including a case and a case holder mounted at the bottom edge portion of said case in order to prevent unnecessary reflecting light from a floor surface based on floor characteristics or a color, and overturning, wherein further comprising;

detecting means of abnormal conditions concerning with said sensor;

warning means including a sound producing means; and after detecting any abnormal conditions of said sensor, a warning signal about said abnormal conditions is issued at least in a form of an audio frequency sound produced by said sound producing means.

* * * * *